US010663120B2

(12) United States Patent
Okahisa

(10) Patent No.: US 10,663,120 B2
(45) Date of Patent: May 26, 2020

(54) LIGHT SOURCE MODULE

(71) Applicant: NICHIA CORPORATION, Anan-shi, Tokushima (JP)

(72) Inventor: Tsuyoshi Okahisa, Tokushima (JP)

(73) Assignee: NICHIA CORPORATION, Anan-Shi (JP)

( * ) Notice: Subject to any disclaimer, the term of this patent is extended or adjusted under 35 U.S.C. 154(b) by 0 days.

(21) Appl. No.: 16/388,758

(22) Filed: Apr. 18, 2019

(65) Prior Publication Data

US 2019/0323665 A1 Oct. 24, 2019

(30) Foreign Application Priority Data

Apr. 20, 2018 (JP) ................................ 2018-081284

(51) Int. Cl.
*F21K 9/69* (2016.01)
*F21K 9/68* (2016.01)
*F21Y 115/10* (2016.01)

(52) U.S. Cl.
CPC ............... *F21K 9/69* (2016.08); *F21K 9/68* (2016.08); *F21Y 2115/10* (2016.08)

(58) Field of Classification Search
CPC .......... F21K 9/68; F21K 9/69; F21Y 2115/10; G02B 19/0061; G02B 19/0014; G03B 15/02; F21V 5/04; H01L 33/58
See application file for complete search history.

(56) References Cited

U.S. PATENT DOCUMENTS

| 10,203,086 B2* | 2/2019 | Kang ...................... F21V 5/007 |
| 2006/0196944 A1 | 9/2006 | Maeda et al. |
| 2011/0141734 A1* | 6/2011 | Li ............................. F21V 5/04 362/235 |
| 2012/0057101 A1 | 3/2012 | Iiyama et al. |
| 2014/0146546 A1 | 5/2014 | Yamada et al. |
| 2014/0204592 A1 | 7/2014 | Miyashita et al. |
| 2014/0293613 A1 | 10/2014 | Saito |

(Continued)

FOREIGN PATENT DOCUMENTS

| JP | 2006-258899 A | 9/2006 |
| JP | 2012-209141 A | 10/2012 |
| JP | 2013-030446 A | 2/2013 |

(Continued)

*Primary Examiner* — Peggy A Neils
(74) *Attorney, Agent, or Firm* — Foley & Lardner LLP

(57) ABSTRACT

A light source module includes: a light source having an upper surface comprising a light emission surface; and a light-guide member comprising a lens portion having a central axis. The lens portion includes: a concave incidence surface facing the light emission surface of the light source; a reflection surface disposed outside the incidence surface, the reflection surface being configurd to reflect part of light entering through the incidence surface, and being inclined at an angle of 45 degrees or more from a direction perpendicular to the central axis; and exit surface. The incidence surface includes: a first incidence area having four-fold symmetry about the central axis and having a curved concave shape in a cross section containing the central axis; and a second incidence area having a curved convex shape in a cross section rotated 45 degrees from the first incidence area and containing the central axis.

10 Claims, 15 Drawing Sheets

(56) References Cited

U.S. PATENT DOCUMENTS

2015/0276170 A1* 10/2015 Motoyanagi .............. F21V 5/04
362/335

FOREIGN PATENT DOCUMENTS

| JP | 2014-209158 A | 11/2014 |
| JP | 2015-090776 A | 5/2015 |
| JP | 2016-046067 A | 4/2016 |
| JP | 2017-103051 A | 6/2017 |
| WO | WO-2011/114608 A1 | 9/2011 |
| WO | WO-2012/176393 A1 | 12/2012 |
| WO | WO-2013/024836 A1 | 2/2013 |
| WO | WO-2013/141649 A1 | 9/2013 |
| WO | WO-2015/129761 A1 | 9/2015 |

\* cited by examiner

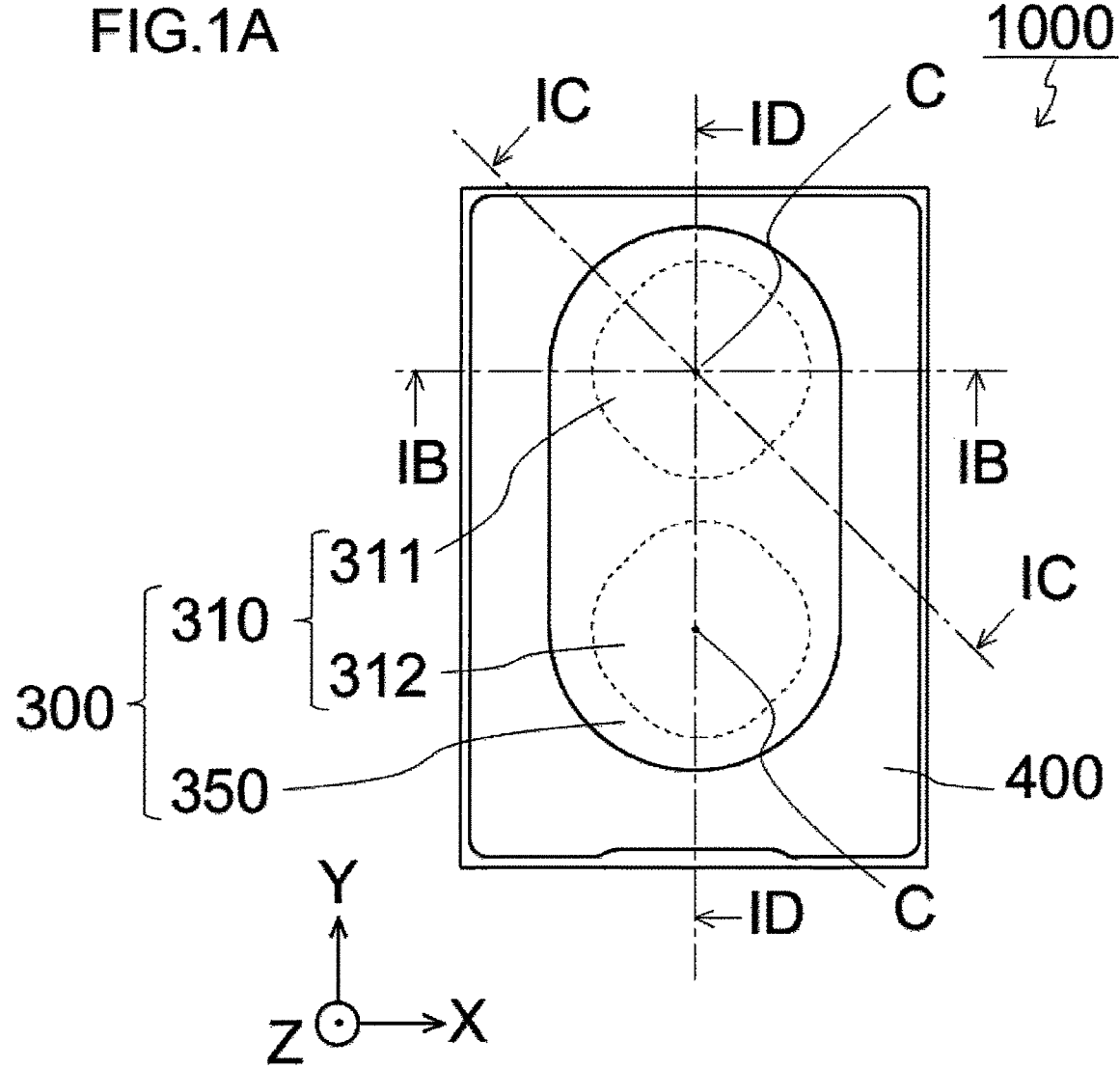

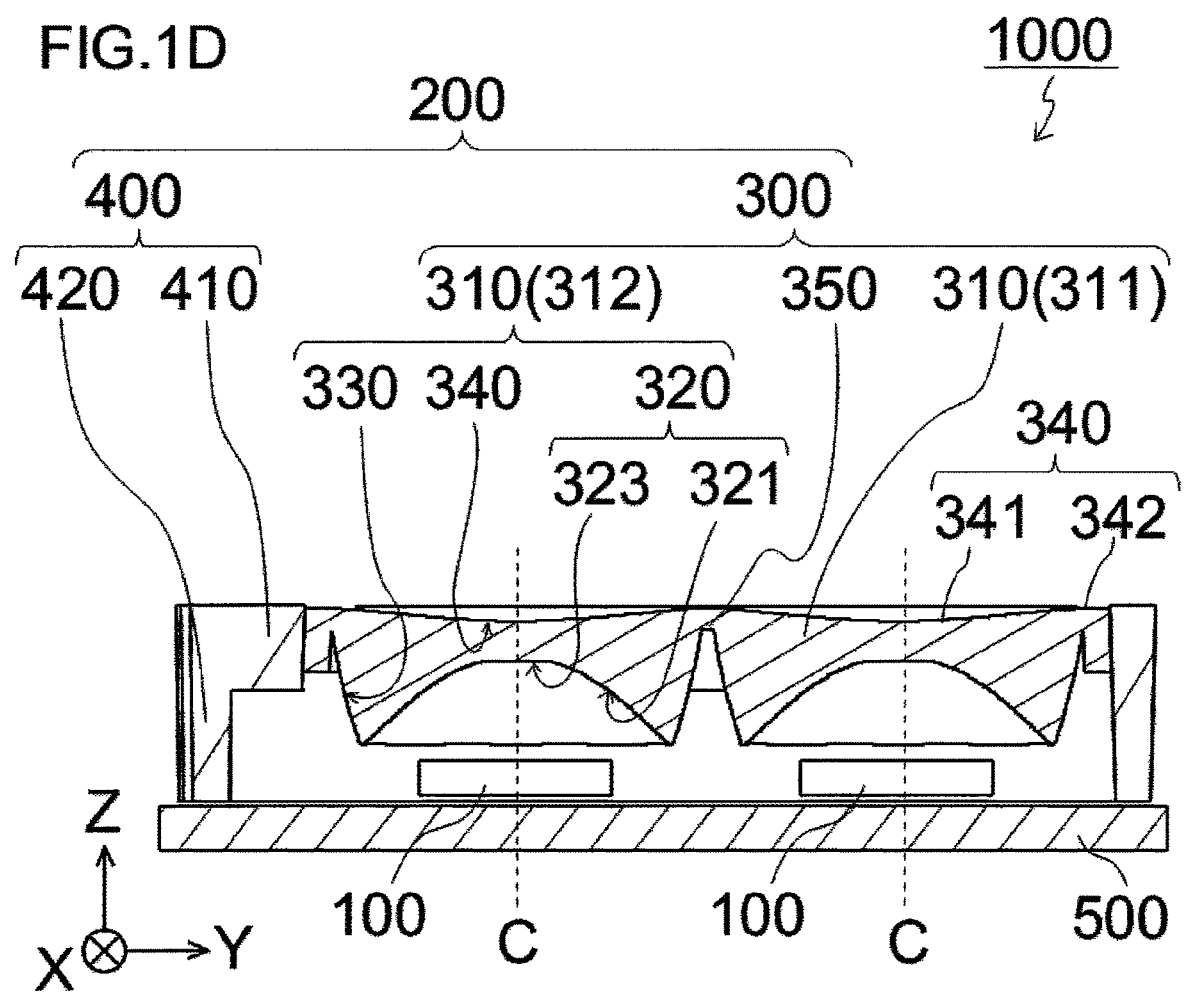

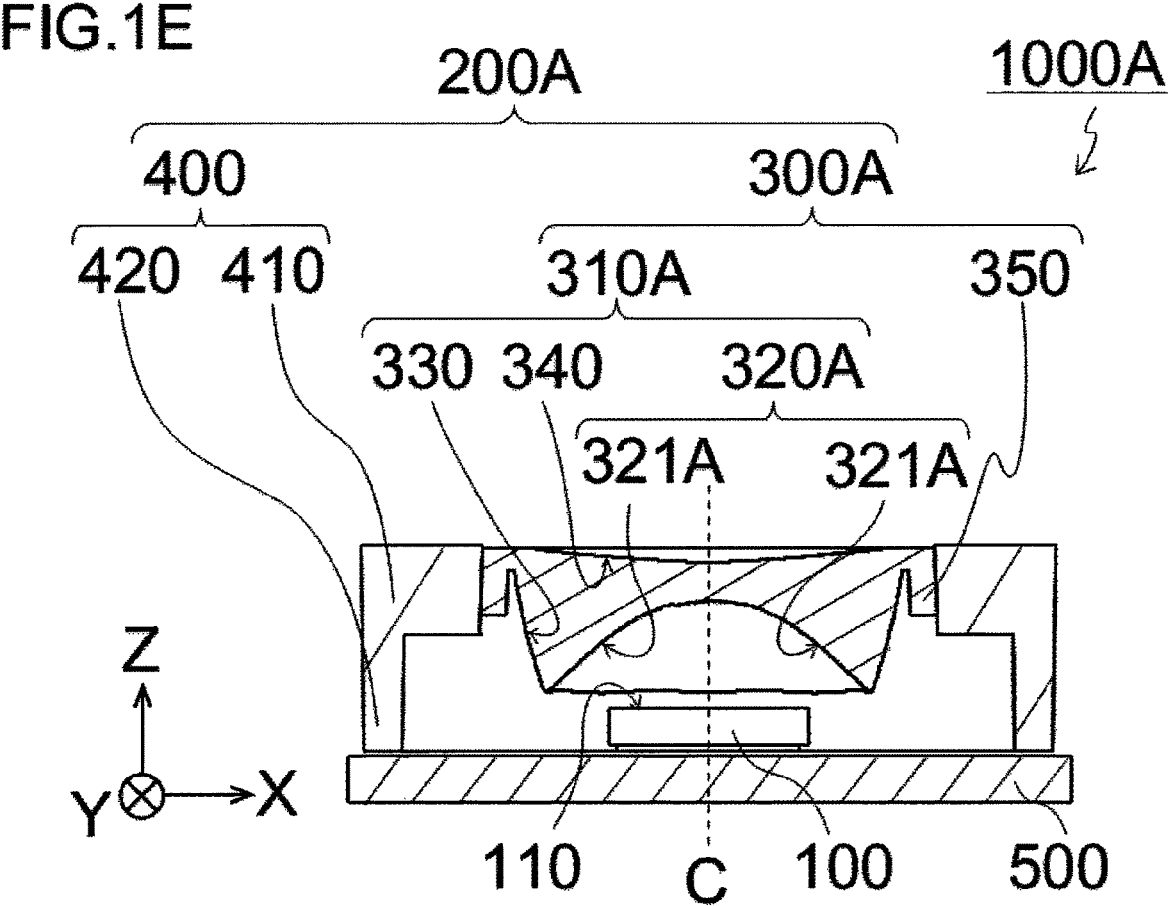

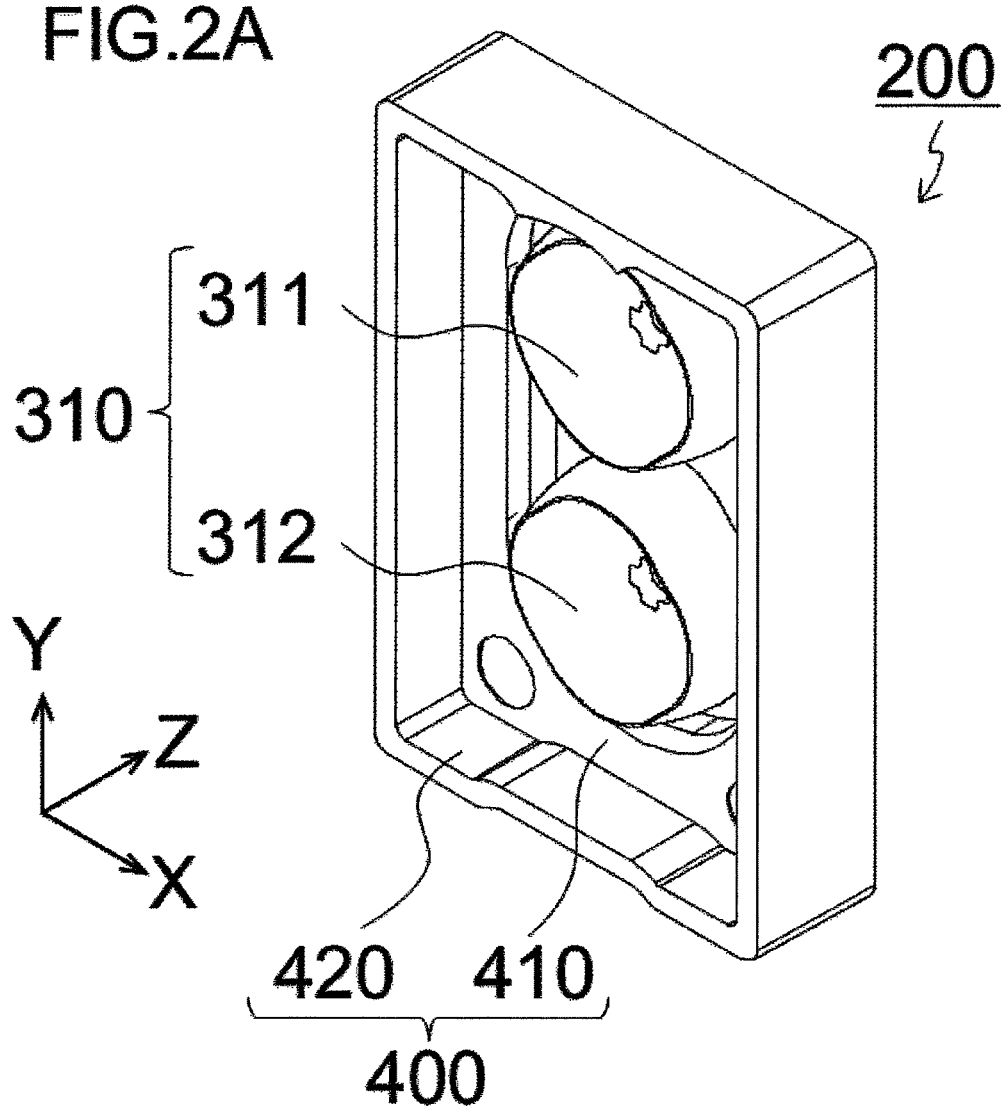

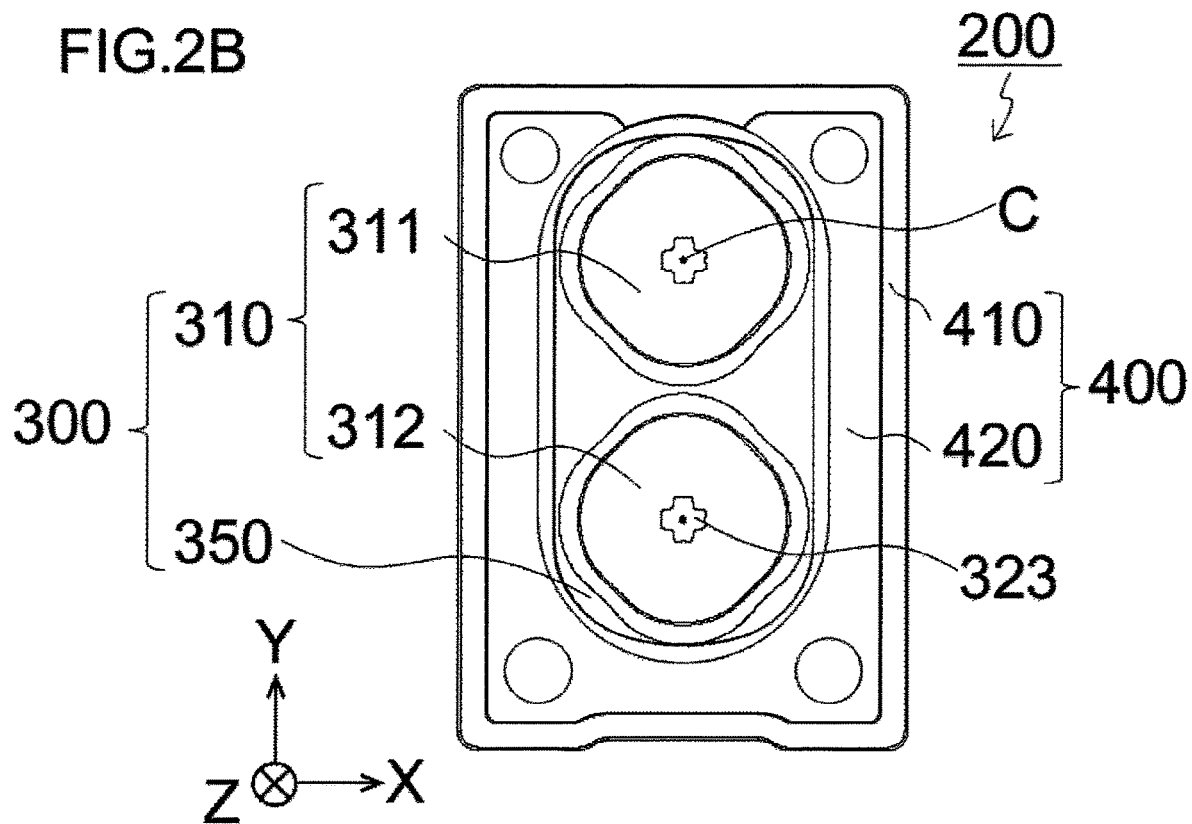

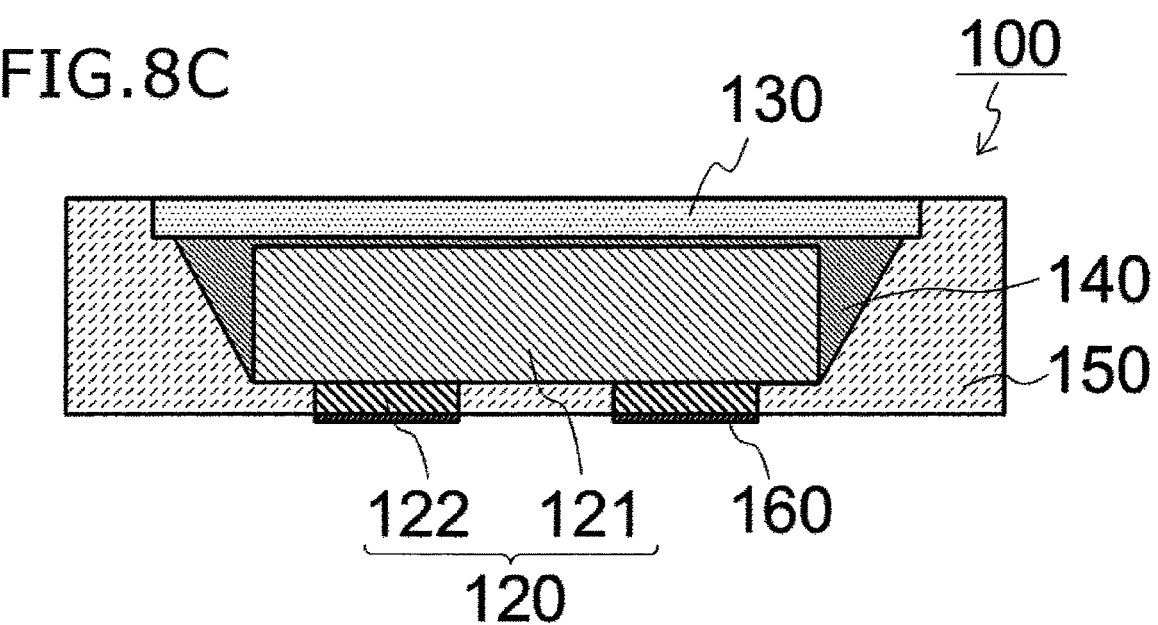

LIGHT SOURCE MODULE

CROSS-REFERENCE TO RELATED APPLICATION

This application claims priority to Japanese Patent Application No. 2018-081284, filed on Apr. 20, 2018, the disclosure of which is hereby incorporated by reference in its entirety.

BACKGROUND OF THE INVENTION

1. Field of the Invention

The present disclosure relates to a light source module.

2. Description of Related Art

Light source modules are known that include lenses and the like for controlling distribution characteristics of light emitted from light sources such as light-emitting diodes (LEDs).

Such light source modules are mounted in, for example, smartphones as illumination lamps for imaging cameras. The areas imaged by imaging cameras are generally quadrangular.

Lenses that make the areas to be irradiated with light emitted from light source modules quadrangular are under study (see, for example, Japanese Publication No. 2014-209158).

In addition, it is desired that the areas to be irradiated are uniformly illuminated.

SUMMARY OF THE INVENTION

According to one embodiment, a light source module includes a light source having an upper surface including a light emission surface and a light-guide member including a lens portion having a central axis through the light emission surface, the lens portion having a concave incidence surface facing the light emission surface of the light source and receiving light from the light source, a reflection surface disposed outside the incidence surface, reflecting part of light entering through the incidence surface, and inclined at an angle of 45 degrees or more from a perpendicular direction relative to the central axis, and an exit surface allowing part of the light entering through the incidence surface and light reflected by the reflection surface to emerge into an outside, the incidence surface including a first incidence area having four-fold symmetry about the central axis and having a curved concave shape in cross section containing the central axis and a second incidence area having a curved convex shape in cross section rotated 45 degrees from the first incidence area and containing the central axis.

With the above structure, the area to be irradiated can be uniformly illuminated.

BRIEF DESCRIPTION OF THE DRAWINGS

FIG. 1A is a schematic plan view of an illustrative light source module according to an embodiment.
FIG. 1D is a schematic sectional view of the light source module taken along the line ID-ID of FIG. 1A.
FIG. 1E is a schematic sectional view of an illustrative modification of the light source module shown in FIG. 1B.
FIG. 2A is a schematic perspective view of an illustrative cover member according to the embodiment.
FIG. 2B is a schematic bottom view of the cover member shown in FIG. 2A.
FIG. 8C is a schematic sectional view of the light source shown in FIG. 8A taken along the line VIIIC-VIIIC.

DETAILED DESCRIPTION

Figure 1B:
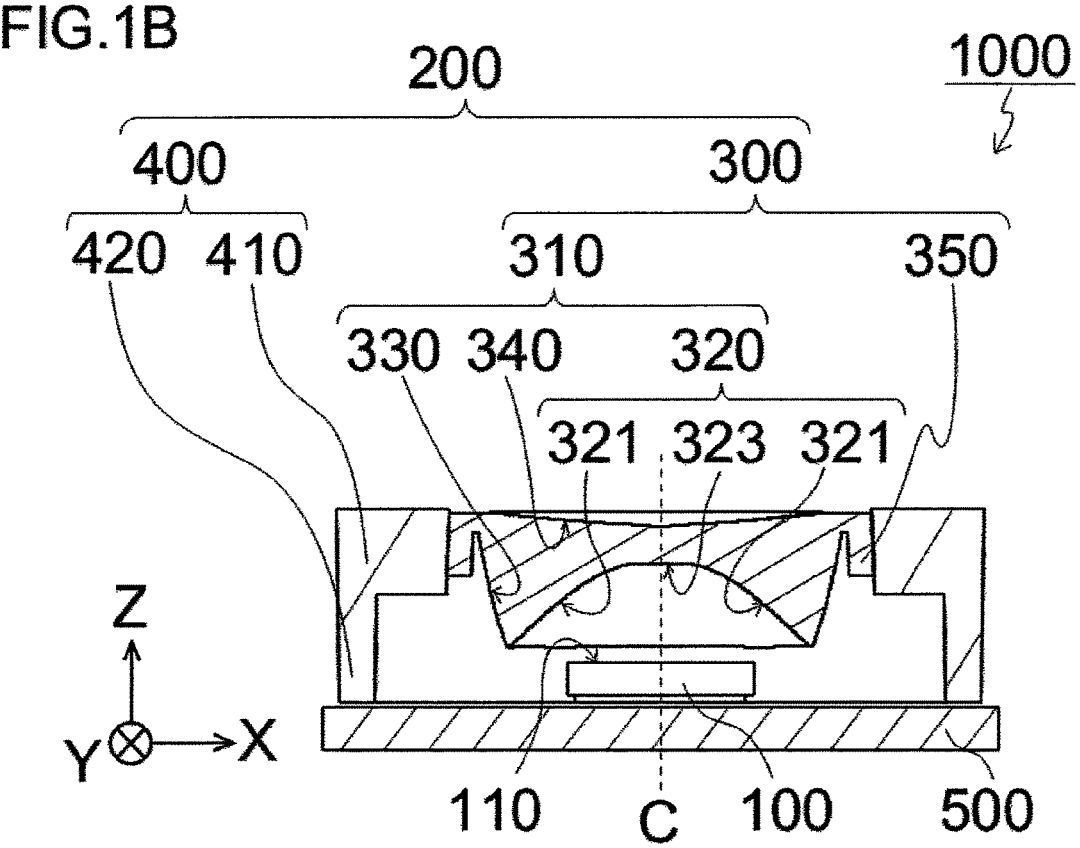
FIG. 1B is a schematic sectional view of the light source module taken along the line IB-IB of FIG. 1A.

The following describes an embodiment of the present invention referring to the accompanying drawings. The embodiment below exemplifies a light source module embodying the technical concept of the present invention and is not intended to limit the light source module of the present invention to the structures below. Unless specifically stated otherwise, sizes, materials, shapes, and relative positions of constituent components do not limit the scope of the present invention to the aforementioned descriptions only but are intended to give examples. In the following descriptions, a direction parallel to a central axis C of a lens portion is regarded as the up/down direction (Z direction). The upper surface of the light source module in the Z direction is a light emission surface (light-extracting surface). Also, the lateral direction (X direction) and the longitudinal direction (Y direction) perpendicular to the lateral direction in an XY-plane perpendicular to the Z direction are used in the descriptions. In addition, in the descriptions, the +Y direction (upward direction) is regarded as 0 degrees, the −Y direction (downward direction) is regarded as 180 degrees, the +X direction (rightward direction) is regarded as 90 degrees, and the −X direction (leftward direction) is regarded as 270 degrees about the central axis C in a plan view. There is a case in which magnitudes or positional relations of members illustrated in the drawings are exaggerated in order to facilitate understanding. In each drawing, part of the drawing may be omitted in consideration of the ease of understanding.

Figure 1C:
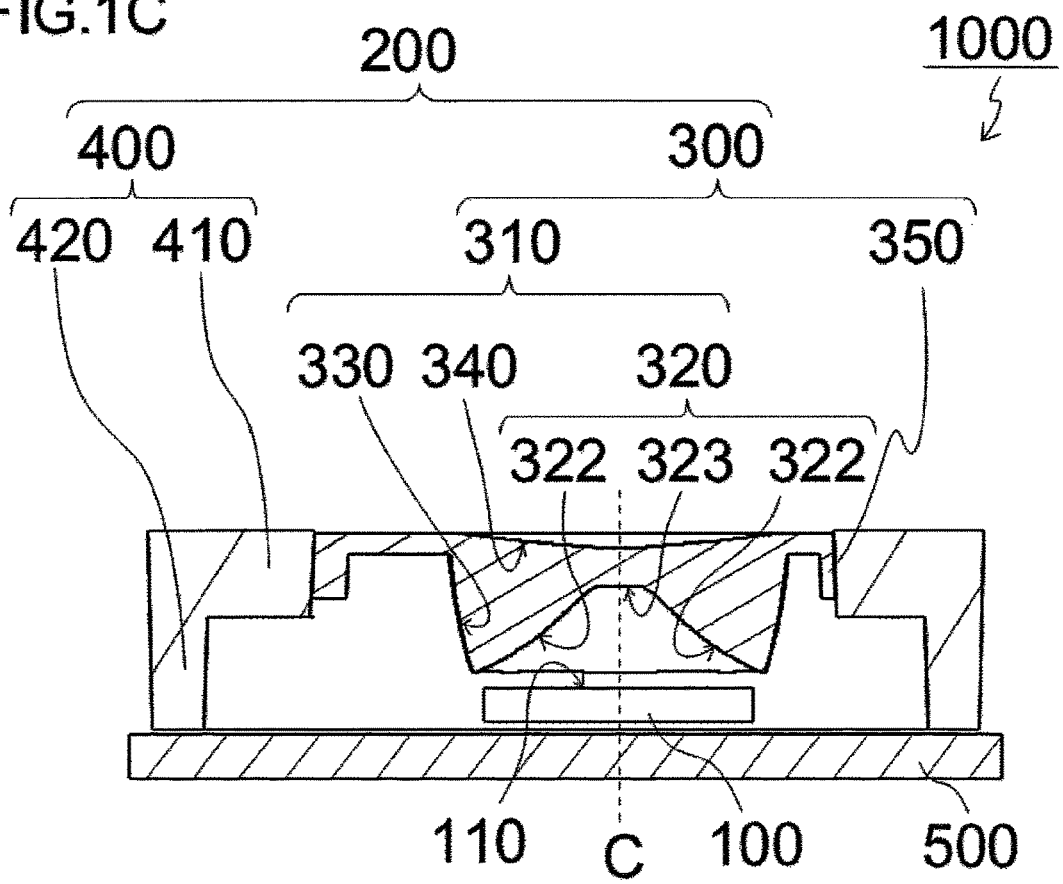
FIG. 1C is a schematic sectional view of the light source module taken along the line IC-IC of FIG. 1A.

FIG. 1A is a schematic plan view of an illustrative light source module 1000 according to the embodiment. FIG. 1B is a schematic sectional view taken along the line IB-IB of FIG. 1A. FIG. 1C is a schematic sectional view taken along the line IC-IC of FIG. 1A. FIG. 1D is a schematic sectional view taken along the line ID-ID of FIG. 1A.

The light source module 1000 includes light sources 100 and a light-guide member 300 disposed above (in the Z direction) the light sources 100. The light sources 100 each have an upper surface including a light emission surface 110. The light-guide member 300 includes lens portions 310 that function as lenses capable of controlling the light distribution. The lens portions 310 of the light-guide member 300 are located directly above the light emission surfaces 110 and each has a central axis C passing through the center of the corresponding light emission surface 110. The central axis C of the lens portion 310 also serves as the optical axis of the lens portion 310. In the example shown in FIG. 1B, FIG. 1C, and other drawings, the optical axis of the light source 100 coincides with the central axis C of the lens portion 310. This structure facilitates the control of the distribution angle of light to be emitted. The optical axis of the light source 100 may not coincide with the central axis C of the lens portion 310.

The lens portion 310 has a concave incidence surface 320 that faces the light emission surface 110 of the light source 100 and receives light emitted from the light source 100. The lens portion 310 has a reflection surface 330 outside the incidence surface 320. The reflection surface 330 reflects part of light entering through the incidence surface 320. The lens portion 310 further has an exit surface 340. The exit surface 340 allows part of the light entering through the incidence surface 320 and light reflected by the reflection surface 330 to emerge into the outside.

The incidence surface 320 of the lens portion 310 has four-fold symmetry (also referred to as 90-degree rotational symmetry or four-fold rotational symmetry) about the central axis C. Specifically, the incidence surface 320 includes first incidence areas 321, each having a curved concave shape in a cross section containing the central axis C, and second incidence areas 322, each having a curved convex shape in cross section containing the central axis C and rotated 45 degrees from the first incidence area 321.

As the second incidence areas 322 of the incidence surface 320 of the lens portion 310 are curved convex surfaces, the second incidence areas 322 are located closer to the light source 100 than the concave first incidence areas 321 in an appropriate horizontal plane (XY-plane) perpendicular to the central axis C. Hence, light emitted from the light source 100 is more likely to be incident on the second incidence areas 322 than on the first incidence areas 321. In other words, the amount of light that enters through the second incidence areas 322, is reflected by the reflection surface 330, and then emerges from the exit surface 340 is larger than the amount of light that enters through the first incidence areas 321, is reflected by the reflection surface 330, and then emerges from the exit surface 340.

In the case in which the light source module 1000 having such light distribution characteristics is used as an illumination lamp for an imaging camera, the amount of light (light derived from light entering through the first incidence areas) diverging in the 0-, 90-, 180-, and 270-degree directions about the central axis toward an area to be imaged that includes an object located in the central axis direction of the lens portion can be smaller than the amount of light (light derived from light entering through the second incidence areas) diverging in four directions rotated 45 degrees from the above directions. The area imaged by the imaging camera is quadrangular. Hence, the quadrangular area to be imaged can be illuminated more uniformly if the lens of the camera and the light source module 1000 are arranged so that the second incidence areas are located at positions corresponding to the four corners of the quadrangular area to be imaged.

The following describes the structure of each component of the light source module according to the embodiment in detail.

(Cover Member)

FIG. 2A and FIG. 2B are schematic perspective and bottom views of a cover member 200 in the light source module 1000 shown in FIG. 1A and other drawings viewed from the incidence surface. The cover member 200 includes the light-guide member 300 including the lens portions 310 that contribute to the control of the light distribution characteristics and includes a supporting member 400 that is disposed around the light-guide member 300 and supports the light-guide member 300.

The cover member 200 covers the light sources 100. The light sources 100 are disposed in a space enclosed by a wiring board 500 and the cover member 200. In addition to the light sources 100, a protective element such as a Zener diode (ZD) or a transient voltage suppressor (TVS), an electronic component such as an optical sensor for measuring brightness, chromaticity, and infrared rays, and the like may be disposed in the same space.

The cover member 200 includes one or more light-guide members 300 and one or more supporting members 400 supporting the light-guide members 300. The present example of the cover member 200 includes one supporting member 400 that supports one light-guide member 300.

(Light-Guide Member)

Figure 3:
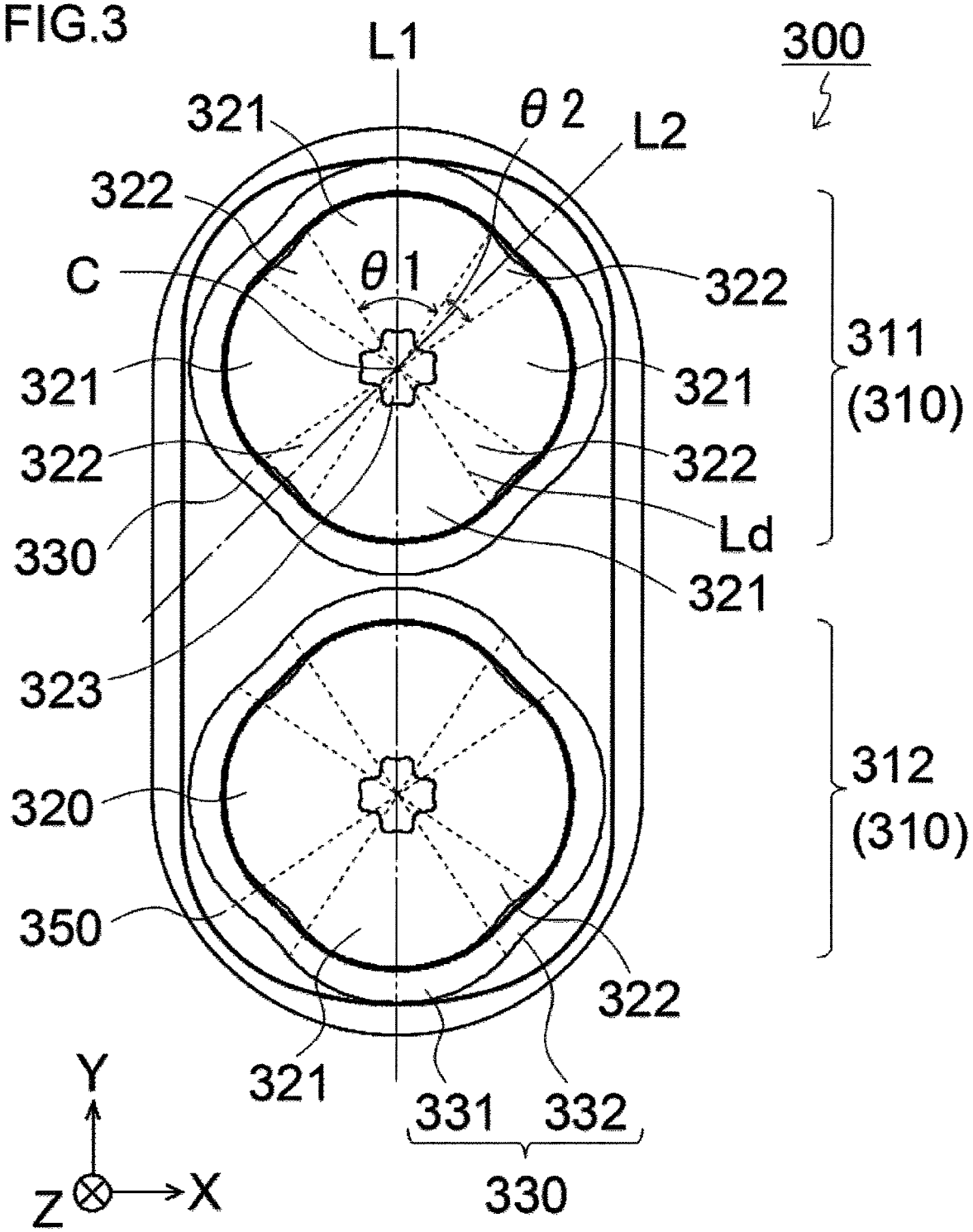
FIG. 3 is a schematic bottom view of illustrative lens portions according to the embodiment.

FIG. 3 is a schematic bottom view of the light-guide member 300 constituting part of the cover member 200 viewed from the incidence surface. The light-guide member 300 includes, in addition to the lens portions 310 that function as lenses for controlling the distribution of light emitted from the light emission surfaces 110 of the light sources 100, a flange 350 supporting the lens portions 310. A light-transmissive member that can transmit light emitted from the light sources 100 constitutes the light-guide member 300. The lens portions 310 and the flange 350 constitute an integrally-molded member. The light-guide member 300 can be formed of a light-transmissive member made of a resin such as a polycarbonate resin, an acrylic resin, a silicone resin, or an epoxy resin. The term "light-transmissive" here means that 50% or more, preferably 80% or more, further preferably 90% or more, of light emitted from the light sources 100 is transmitted.

The light-guide member 300 can include one or more lens portions 310. FIG. 3 illustrates the light-guide member 300 including two lens portions 310: a first lens portion 311 and a second lens portion 312. Common features shared by the first lens portion 311 and the second lens portion 312 are described referring to the lens portion 310 without discriminating between the lens portions.

In the case in which one light-guide member 300 includes two or more lens portions 310, the lens portions 310 may be molded in one piece with the flange 350 therebetween. Alternatively, a plurality of light-guide members each may include one lens portion.

(Lens Portions)

The lens portions 310 are members that control the distribution of light emitted from the light sources 100. The lens portions 310 each have the incidence surface 320 mainly located on the lower surface, the reflection surface 330 mainly located on the lateral surface, and the exit surface 340 mainly located on the upper surface. The lens portion 310 has the central axis C at the center of the light emission surface 110 of the light source 100. The incidence surface 320 and the exit surface 340 are located such that the incidence surface 320 and the exit surface 340 enclose the central axis C. The reflection surface 330 is located away from the central axis C.

First, the incidence surface 320 will be described. The incidence surface 320 of the lens portion 310 has a concave shape as a whole on the lower surface of the lens portion 310. In other words, the incidence surface 320 of the lens portion 310 is the inner surface of a depressed portion that is open on the lower side of the lens portion 310. The size (diameter) of the opening of the incidence surface 320 at the lower end is preferably larger than the area of the light emission surface 110 of the light source 100. In other words, it is preferable that the entire light emission surface 110 of the light source 100 face the incidence surface 320. With this structure, light emitted from the light source 100 can be efficiently incident on the incidence surface 320.

The portion at which the central axis C of the lens portion 310 is located is the center of the incidence surface 320. The center of the incidence surface 320 is located at the highest position in the Z direction as shown in FIG. 1B and other drawings.

The incidence surface 320 has four-fold symmetry about the central axis C. A shape having four-fold symmetry is a shape that looks the same after a 90-degree rotation on the central axis C.

The incidence surface 320 includes the first incidence areas 321 each having a curved concave shape in cross section containing the central axis C. The incidence surface 320 further includes the second incidence areas 322 each having a curved convex shape in cross section that is rotated 45 degrees from the first incidence areas 321 about the central axis C and contains the central axis C. As shown in FIG. 1B and other drawings, the incidence surface 320 may include a flat third incidence area 323 at the position of the central axis C in a plane (XY-plane) perpendicular to the central axis C.

It is preferable that the shapes of the first incidence areas 321 and the second incidence areas 322 smoothly change at the boundaries between the first incidence areas 321 and the second incidence areas 322. In this case, it is difficult to visually recognize the boundaries between the first incidence areas 321 and the second incidence areas 322 clearly as shown in FIG. 2B. Hence, the boundaries are not shown. As described above, the incidence surface 320 according to the present embodiment may include incidence areas that are not part of either of the first incidence areas 321 and the second incidence areas 322 at the boundaries between the first incidence areas 321 and the second incidence areas 322. The incidence surface of the present application may include such incidence areas. The boundaries between the first incidence areas 321 and the second incidence areas 322 may be clearly visually recognizable.

As the third incidence area 323 is a flat surface, its outer edge is clear as shown in FIG. 2B. In other words, the boundary between the first and second incidence areas 321 and 322 and the third incidence area 323 is clear. The boundary between the first and second incidence areas 321 and 322 and the third incidence area 323 may be unclear because of the smooth change of the shapes.

Figure 4A:
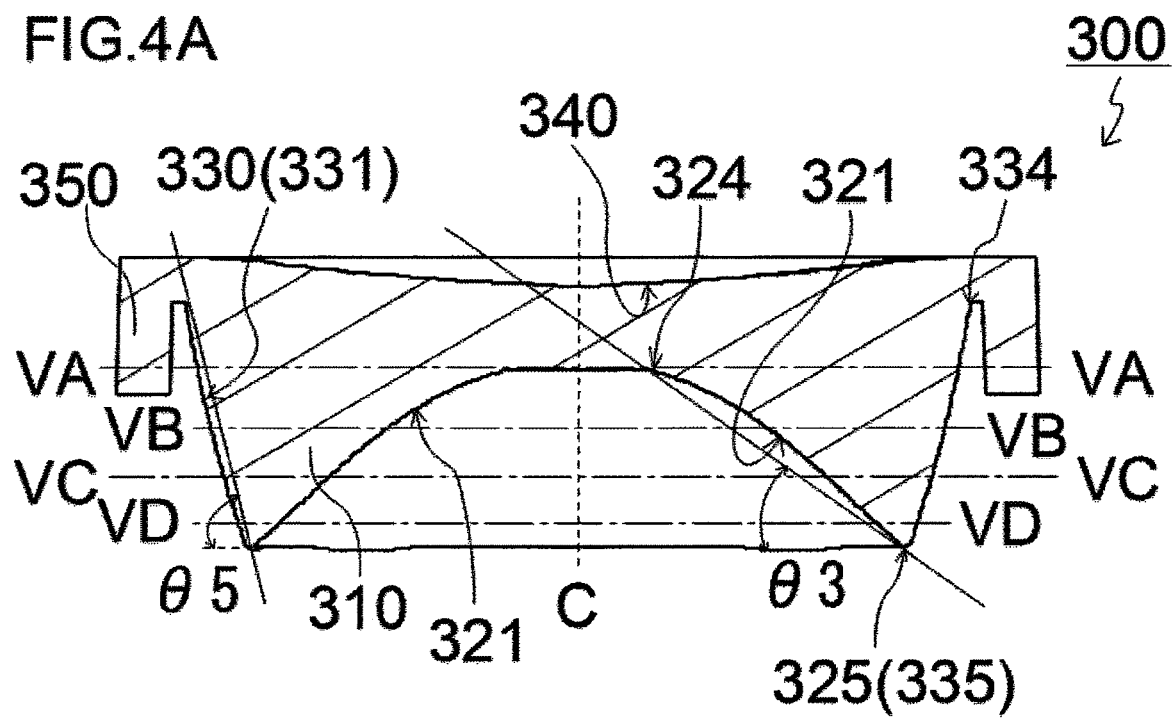
FIG. 4A is a schematic enlarged sectional view of a lens portion shown in FIG. 1B.

The first incidence areas 321 each have a curved concave shape in cross section containing the central axis C as shown in FIG. 1B, FIG. 1D, and FIG. 4A showing a schematic enlarged view of part of FIG. 1B. FIG. 1B is a schematic sectional view by an XZ-plane containing the central axis C. FIG. 1D is a schematic sectional view by a YZ-plane containing the central axis C. As the incidence surface 320 has four-fold symmetry in the present embodiment, the incidence surface 320 of the lens portion 310 shown in FIG. 1B has the same shape as the incidence surface 320 of the lens portion 310 shown in FIG. 1D.

Each of the first incidence areas 321 is one curved concave surface that continues from an upper end 324 of the incidence surface 320 located on the central axis C or its vicinity to a lower end 325 of the incidence surface 320 near the light source 100 in the above sections containing the central axis C. In other words, the first incidence area 321 is a curved surface that is convex outward.

Figure 4B:
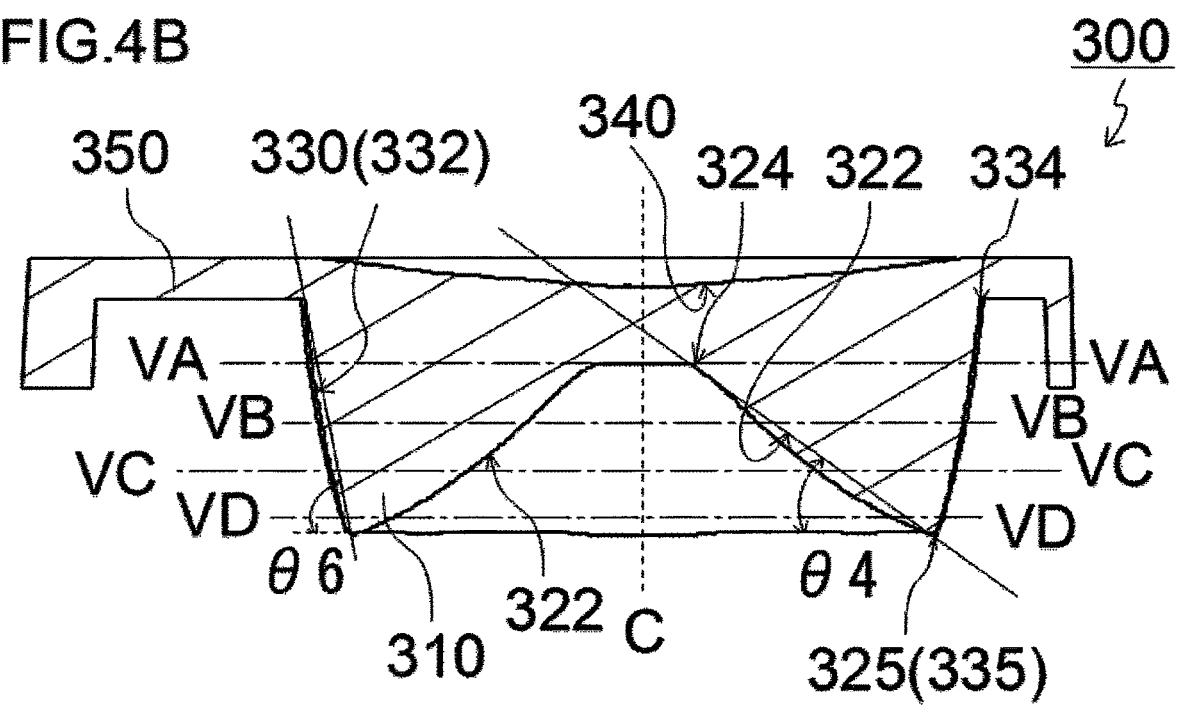
FIG. 4B is a schematic enlarged sectional view of the lens portion shown in FIG. 1C.

The second incidence areas 322 each have a curved convex shape in cross section containing the central axis C as shown in FIG. 1C and FIG. 4B. Specifically, each of the second incidence areas 322 is one curved convex surface that continues from the upper end 324 of the incidence surface located on the central axis C or its vicinity to the lower end 325 near the light source 100 in the sections containing the central axis C.

The first incidence areas 321 and the second incidence areas 322 can be partitioned by eight boundary lines Ld indicated by dashed lines radially extending from the central axis C as shown in FIG. 3. The boundary lines Ld may not be visually recognizable in the case in which the shapes smoothly change. The incidence surface 320 includes eight areas partitioned by the boundary lines Ld, that is, four first incidence areas 321 and four second incidence areas 322. Specifically, the first incidence areas 321 and the second incidence areas 322 are alternately disposed in the incidence surface 320 in the direction of rotation about the central axis C.

Each of the first incidence areas 321 and each of the second incidence areas 322 respectively have predetermined central angles θ1 and θ2. The statement that these two areas "are disposed at positions rotated 45 degrees" means that the angle between a first center line L1 passing through the central axis C and dividing a first incidence area 321 into two equal parts and a second center line L2 passing through the central axis C and dividing a second incidence area 322 into two equal parts is 45 degrees. In the present specification, descriptions of the first incidence areas 321 and the second incidence areas 322 are descriptions mainly of the portions located around the first center line L1 and the second center line L2 unless otherwise described.

The first incidence areas 321 and the second incidence areas 322 are partitioned by the boundary lines Ld as described above, and the central angles θ1 and θ2 can be appropriately adjusted depending on desired light distribution angles. For example, FIG. 3 shows illustrative lens portions 310 in which the area of each first incidence area 321 is larger than the area of each second incidence area 322 in the incidence surfaces 320. For example, in the case of a lens portion 310 having a thickness of approximately 2 mm or less and a diameter of approximately 4 mm of the exit surface of the lens portion 310, making the area of the first incidence area 321 smaller than the area of the second incidence area 322 increases the amount of light emitted in the 45-degree direction. In this case, for example, the area to be irradiated can be uniformly illuminated when the module is used as an illumination lamp for a camera with an angle of view of 120 degrees or more.

For example, in the case in which the light source module including the lens portion having the above size is used as an illumination lamp for a camera with an angle of view of approximately 120 degrees or less, the area to be irradiated can be uniformly illuminated if a lens portion in which the area of the second incidence area 322 is smaller than the area of the first incidence area 321 is used. As described above, the ratio between the first incidence area and the second incidence area can be adjusted depending on the target light distribution angle and the like. Various light distribution characteristics can be obtained by also adjusting the angle of the reflective surface.

FIG. 3 shows illustrative incidence surfaces 320 in which the central angle θ1 of each first incidence area 321 is larger than the central angle θ2 of each second incidence area 322. The central angle θ1 of the first incidence area 321 of the incidence surface 320 can be, for example, in a range of 10 degrees to 80 degrees. In the example shown in FIG. 3, the central angle θ1 of the first incidence area 321 is 68 degrees, and the central angle θ2 of the second incidence area 322 is 22 degrees.

Figure 5A:
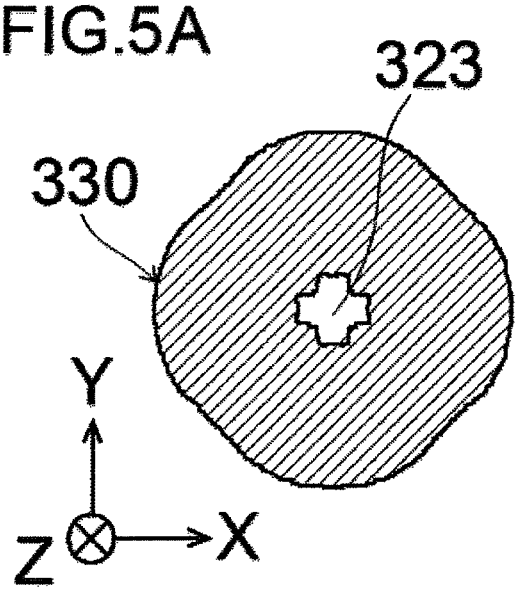
FIG. 5A is a schematic end view of the lens portion taken along the line VA-VA shown in FIG. 4A and FIG. 4B.
Figure 5B:
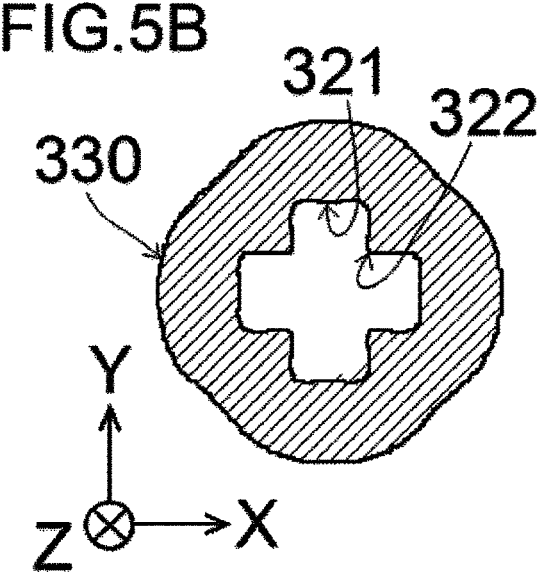
FIG. 5B is a schematic end view of the lens portion taken along the line VB-VB shown in FIG. 4A and FIG. 4B.
Figure 5C:
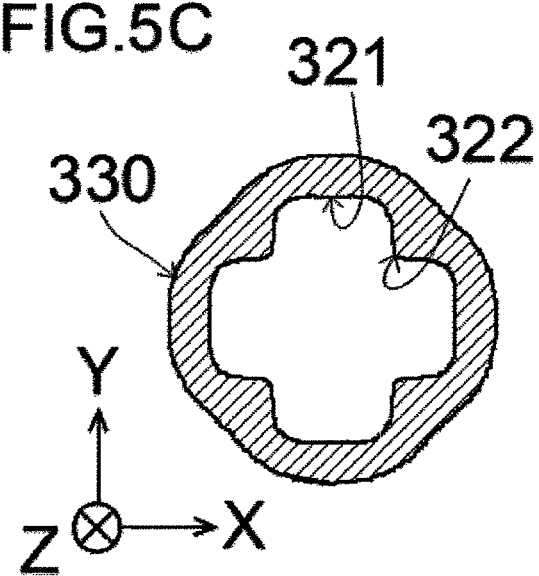
FIG. 5C is a schematic end view of the lens portion taken along the line VC-VC shown in FIG. 4A and FIG. 4B.
Figure 5D:
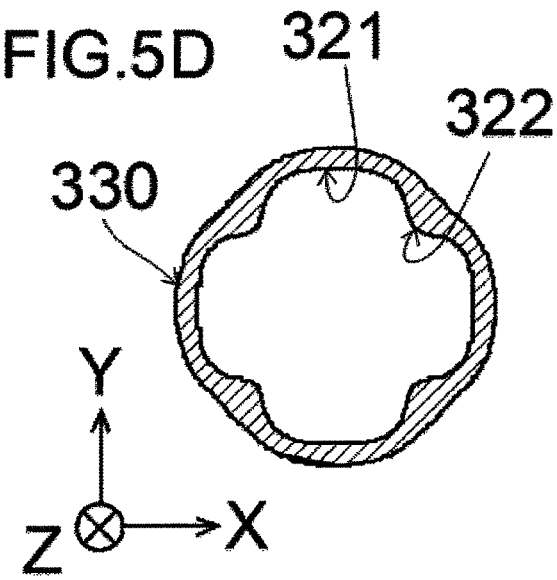
FIG. 5D is a schematic end view of the lens portion taken along the line VD-VD shown in FIG. 4A and FIG. 4B.

FIG. 4A is a schematic enlarged sectional view of one lens portion 310 shown in FIG. 1B. FIG. 4B is a schematic enlarged sectional view of one lens portion 310 shown in FIG. 1C. FIG. 5A is a schematic end view taken along the line VA-VA of FIG. 4A and FIG. 4B. FIG. 5B is a schematic end view taken along the line VB-VB of FIG. 4A and FIG. 4B. FIG. 5C is a schematic end view taken along the line VC-VC of FIG. 4A and FIG. 4B. FIG. 5D is a schematic end view taken along the line VD-VD of FIG. 4A and FIG. 4B.

As shown in these drawings, in an appropriate horizontal plane (XY-plane) perpendicular to the central axis C, the second incidence areas 322 are located closer to the central axis C than the first incidence areas 321 are. This structure increases the amount of light incident on the second incidence areas 322.

The first incidence areas 321 each have a curved concave shape in cross section containing the central axis C as shown in FIG. 4A. Specifically, the first incidence areas 321 are each located outside (the side opposite to the central axis C) a straight line connecting the upper end 324 and the lower end 325 of the first incidence area 321. An angle θ3 between the straight line connecting the upper end 324 and the lower end 325 of the first incidence area 321 and the horizontal plane can be 20 degrees to 70 degrees. With this structure, the angle of incidence of light on the reflection surface 330 can be controlled. The phrase "angle between the straight line connecting the upper end and the lower end of the first incidence area and the horizontal plane" as used herein means one provided particularly as an acute angle formed by the said straight line and the horizontal plane. The angle between a straight line connecting the upper end and the lower end of a curved surface and the horizontal plane may be simply referred to as, for example, "the angle θ3 of the first incidence area".

The second incidence areas 322 each have a curved convex shape in cross section containing the central axis C as shown in FIG. 4B. Specifically, the second incidence areas 322 are each located inside (the side closer to the central axis C) a straight line connecting the upper end 324 and the lower end 325 of the second incidence area 322. An angle θ4 (angle θ4 of the second incidence area) between the straight line connecting the upper end 324 and the lower end 325 of the second incidence area 321 and the horizontal plane can be 20 degrees to 70 degrees. With this structure, light emitted from the light source 100 is more likely to be incident on the second incidence area 322 than on the first incidence area 321. The phrase "angle between the straight line connecting the upper end and the lower end of the second incidence area and the horizontal plane" as used herein means one provided particularly as an acute angle formed by the said straight line and the horizontal plane. The angle θ4 is preferably smaller than the angle θ3. With this structure, light emitted from the light source 100 is more likely to be incident on the second incidence area 322 than on the first incidence area 321.

Figure 6A:
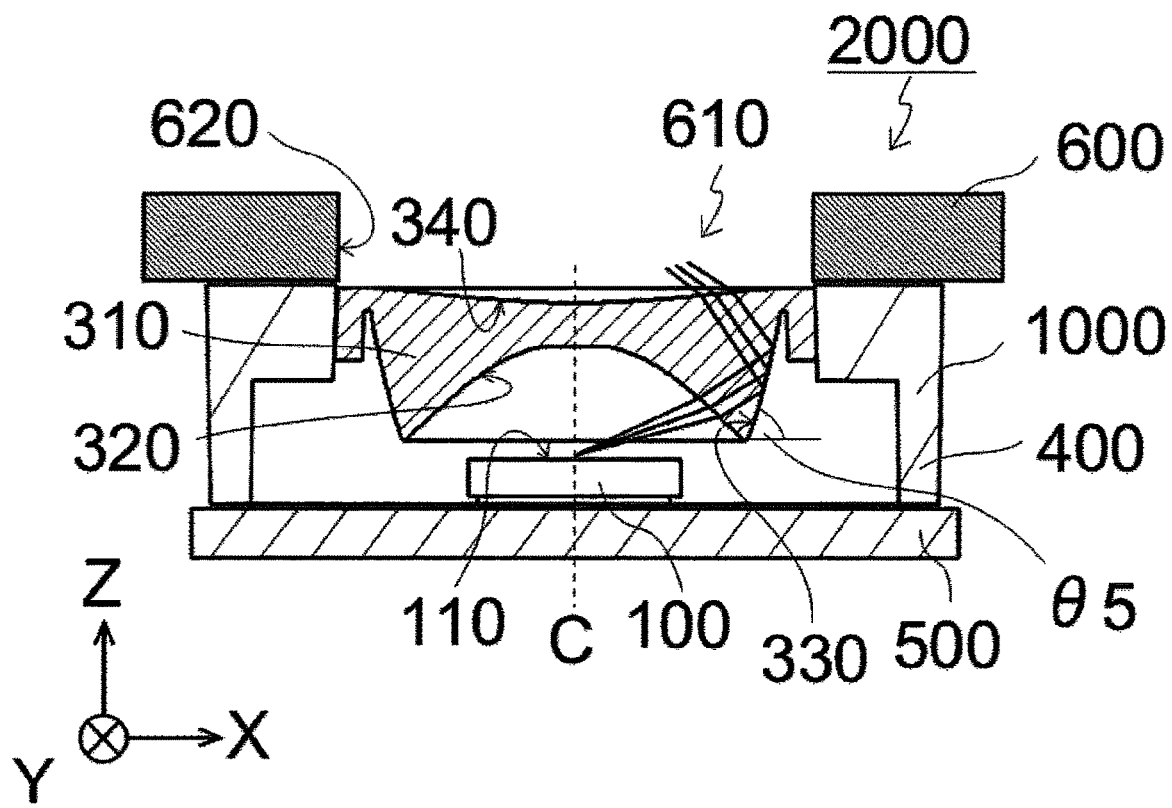
FIG. 6A is a schematic, partial, enlarged view of an illustrative electronic device including the light source module according to the embodiment.
Figure 6B:
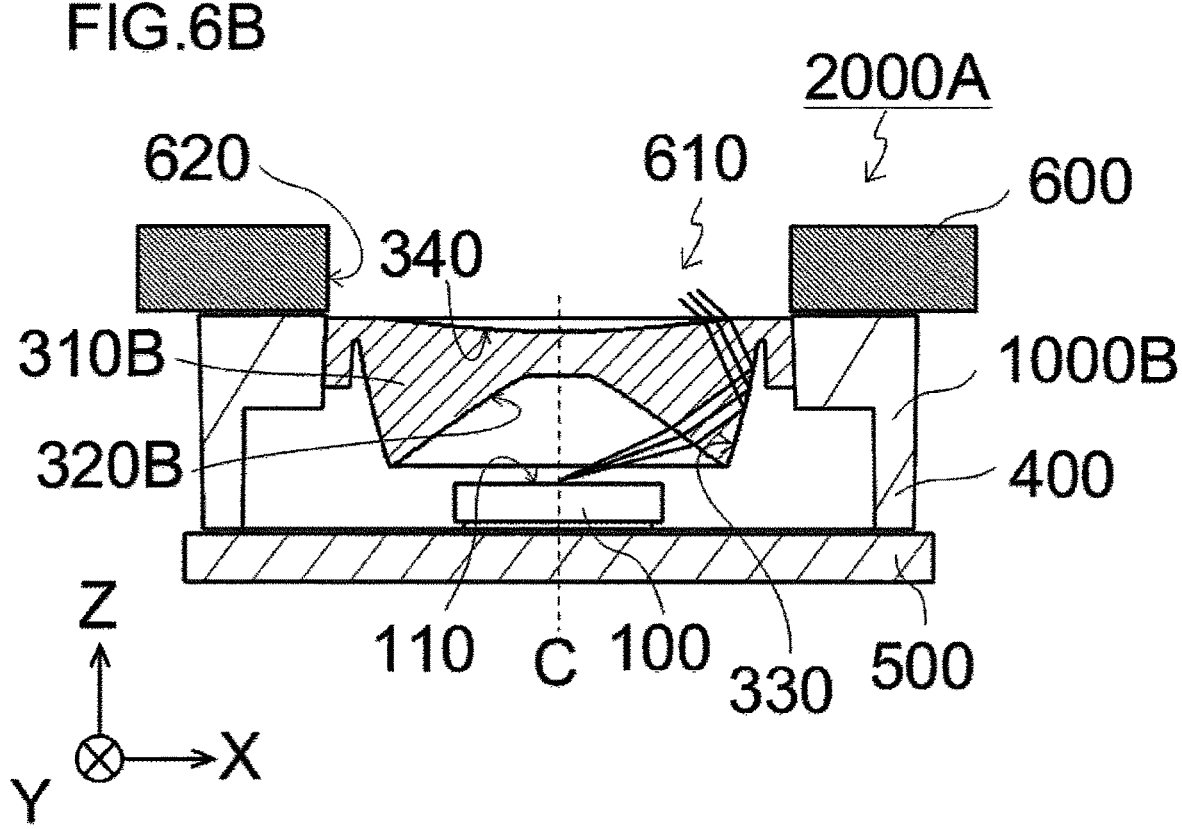
FIG. 6B is a schematic, partial, enlarged view of an illustrative electronic device including a light source module according to the embodiment.
Figure 6C:
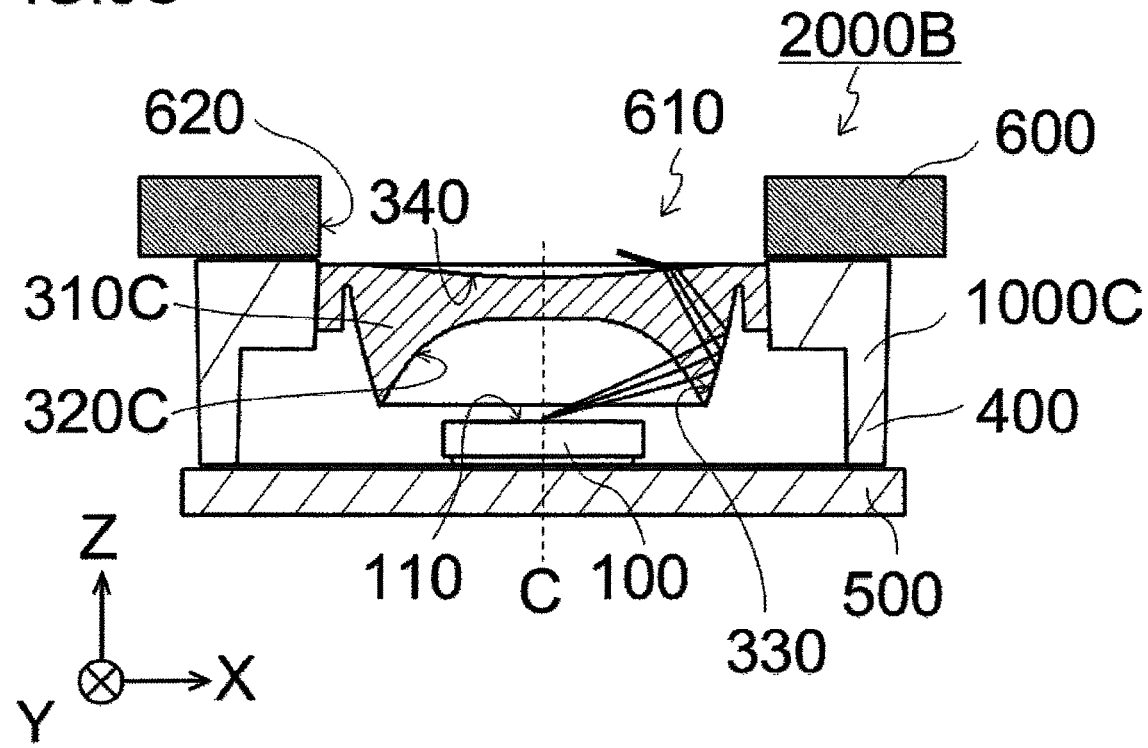
FIG. 6C is a schematic, partial, enlarged view of an illustrative electronic device including a light source module according to the embodiment.

FIG. 6A, FIG. 6B, and FIG. 6C are schematic diagrams for illustrating variations in light distribution characteristics provided by incidence surfaces 320, 320B, and 320C of lens portions 310, 310B, and 310C with different radius of curvatures. The shapes of the reflection surfaces 330 and the exit surfaces 340 of the lens portions are the same.

FIG. 6A is a schematic, partial, enlarged view of an illustrative electronic device 2000 including the light source module 1000. Examples of the electronic device 2000 include a smartphone, a tablet, and a digital camera. The drawing shows an enlarged view of a portion including the light source module 1000. The light source module 1000 is housed inside a case 600 having an opening 610.

An electronic device 2000A shown in FIG. 6B differs in the light source module employed from the electronic device 2000 shown in FIG. 6A. Specifically, the radius of curvature of the incidence surface 320B of the lens portion 310B in a light-guide member employed in a cover member of a light source module 1000B is larger than the radius of curvature of the incidence surface 320 of the lens portion 310 shown in FIG. 6A. That is, the incidence surface 320B is a curved concave surface closer to a flat surface than the incidence surface 320 is. The distribution angle of light reflected by the reflection surface 330 and emitted from the exit surface 340 is therefore smaller than the distribution angle of light shown in FIG. 6A. In other words, the light shown in FIG. 6B is emitted at such an angle that the light is closer to the Z axis direction than the light shown in FIG. 6A is.

The radius of curvature of the incidence surface 320C of the lens portion 310C in an electronic device 2000B shown in FIG. 6C is smaller than the radius of curvature of the incidence surface 320 of the lens portion 310 shown in FIG. 6A. That is, the incidence surface 320C is a curved concave surface that is more greatly depressed than the incidence surface 320 is. The distribution angle of light reflected by the reflection surface 330 and emitted from the exit surface 340 is therefore larger than the distribution angle of light shown in FIG. 6A. In other words, the light shown in FIG. 6C is emitted at such an angle that the light is farther from the Z axis direction and closer to the XY-plane than the light shown in FIG. 6A is.

Reducing the radius of curvature of the incidence surface as described above increases the distribution angle of light emitted from the exit surface. Light emitted from the exit surface via the reflection surface 330 has been described referring to FIG. 6A to FIG. 6C. The following describes light that enters through the incidence surface and is directly emitted from the exit surface without being reflected by the reflection surface 330. That is, as the radius of curvature of a first incidence area of the incidence surface 320B shown in FIG. 6B is larger than the radius of curvature of the first incidence area of the incidence surface 320 shown in FIG.

6A, the angle of incidence of light incident on the exit surface 340 without being reflected by the reflection surface 330 is large, so that the distribution angle of light emitted from the exit surface 340 is likely to be small. In addition, as the radius of curvature of a first incidence area of the incidence surface 320C shown in FIG. 6C is smaller than the radius of curvature of the first incidence area of the incidence surface 320 shown in FIG. 6A, the angle of incidence of light incident on the exit surface 340 without being reflected by the reflection surface 330 is small, so that the distribution angle of light emitted from the exit surface 340 is large. Descriptions have been made referring to varying radii of curvature of the first incidence areas 321, which are curved concave surfaces, of the incidence surfaces 320 shown in FIG. 6A to FIG. 6C. In the case in which the radius of curvature of the second incidence area 322, which is a curved convex surface, changes, the relation in the case of the first incidence area is reversed. That is, light emitted from the light source 100 and entering through the second incidence area 322, which is a curved convex surface, increases if its radius of curvature decreases. Light incident on the reflection surface 330 also increases, so that the distribution angle of light emitted from the exit surface 340 increases.

In the present embodiment, an area through which the central axis C extends at the center of the incidence surface 320 may include the flat third incidence area 323 parallel to the XY-plane perpendicular to the central axis C as shown in FIG. 2B, FIG. 5A, and other drawings. The third incidence area 323 is surrounded by four first incidence areas 321 and four second incidence areas 322 and has a cross-like shape projecting upward, downward, rightward, and leftward from the central axis C. Because the first incidence areas 321 located on the upper, lower, right, and left sides of the central axis C are located farther than the second incidence areas 322 located at positions rotated 45 degrees are, the interfaces between the first incidence areas 321 and the third incidence area 323 are located farther from the central axis C than the interfaces between the second incidence areas 322 and the third incidence area 323 are.

Such a third incidence area 323 prevents decrease in the strength of the light-guide member 300. The light-guide member 300 having the concave incidence surface 320 is thinnest on a portion located on the central axis C. Hence, disposing the flat third incidence area 323 on the portion located on the central axis C increases the thickness of the light-guide member 300 and prevents decrease in the strength of the light-guide member 300. If an area corresponding to the third incidence area 323 of a mold is flat when the light-guide member 300 is to be formed, such as when a liquid resin is injected in the mold, the gap between the lower surface and the upper surface can increase. This structure prevents the flow of the resin from being obstructed and facilitates the flow of the resin in the mold. The size of the third incidence area 323 can be approximately 50% or less, preferably 30% or less, more preferably 5% or less, of the size of the opening of the incidence surface 320. This structure increases the areas of the first incidence areas 321 and the second incidence areas 322 that contribute to the control of the distribution angle and enables efficient control of the distribution angle.

Figure 1F:
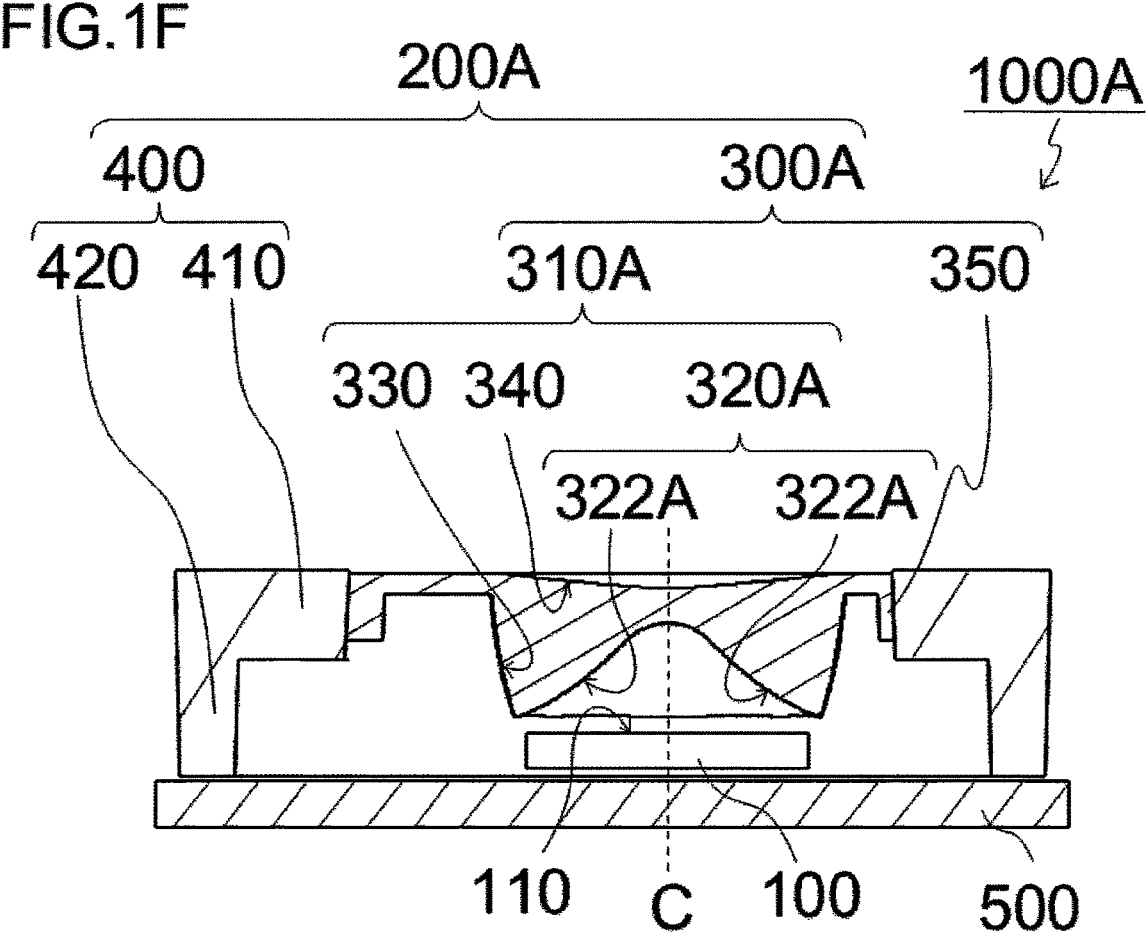
FIG. 1F is a schematic sectional view of the modification of the light source module shown in FIG. 1C.

A light source module 1000A shown in FIG. 1E and FIG. 1F is a modification of the light source module 1000 shown in FIG. 1B to FIG. 1D. Specifically, a cover member 200A in the light source module 1000A is different in that a light-guide member 300A includes a lens portion 310A including no third incidence area on an incidence surface 320A enclosing the central axis C. The incidence surface 320A of the lens portion 310A includes first incidence areas 321A, each having a curved concave shape in cross section containing the central axis, and second incidence areas 322A, each having a curved convex shape in cross section that is rotated 45 degrees and contains the central axis C.

As shown in FIG. 1E, the first incidence areas 321A are continuous on the central axis C. Similarly, as shown in FIG. 1F, the second incidence areas 322A are continuous on the central axis C. Not disposing a horizontal surface perpendicular to the central axis C as described above increases the distribution angle of light emitted in the central axis C direction and prevents the center of the area to be irradiated from being too brightly lit compared with the other portion, so that the area to be irradiated is uniformly illuminated.

Next, the reflection surface 330 will be described. The reflection surface 330 of the lens portion 310 is located on the lateral surface of the lens portion 310 and reflects part of light entering through the incidence surface 320. As shown in FIG. 4A, FIG. 4B, and other drawings, the reflection surface 330 is inclined such that an upper end 334 of the reflection surface 330 is located outside (on the side farther from the central axis C) a lower end 335 of the reflection surface 330 in cross section containing the central axis C. The reflection surface 330 here is a curved convex surface that is convex outward.

As the upper end 334 is located outside the lower end 335, the reflection surface 330 surrounding the incidence surface 320 can be visually recognized as shown in the schematic bottom view of FIG. 3. The reflection surface 330 may be straight or curved in cross section containing the central axis C. A curved concave surface is preferable. In the case in which the reflection surface 330 is straight in a sectional view, the angle between a horizontal plane and the inclined reflection surface 330 preferably falls within the range of 45 degrees to 90 degrees. In the case in which the reflection surface 330 is a curved concave surface, the angle (angle of the reflection surface) between a straight line connecting the lower end 335 and the upper end 334 of the reflection surface 330 and a horizontal plane (XY-plane) is preferably 45 degrees to 90 degrees, more preferably 60 degrees to 90 degrees, further preferably 70 degrees to 90 degrees. With this structure, light can be reflected by the reflection surface 330 toward, for example, the central axis C (in a direction intersecting the central axis C) as shown in FIG. 6A. The phrase "angle between a straight line connecting the lower end and the upper end of the reflection surface and a horizontal plane", i.e., "angle between a straight line connecting the upper end and the lower end of the reflection surface and a horizontal plane" as used herein means one provided particularly as a right or acute angle formed by the said straight line and the horizontal plane.

If the reflection surface 330 is inclined at an angle close to 90 degrees relative to the horizontal plane (XY-plane) as described above, light is reflected by the reflection surface 330 toward, for example, the central axis C as shown in FIG. 6A. That is, light is emitted from the light source 100 in directions (directions extending away from the central axis C) spreading outward with the central axis C being the center and further travels outward after being incident on the incidence surface 320. On the other hand, light reflected by the reflection surface 330 travels toward the central axis C direction, which is opposite to the previous direction of propagation. Accordingly, the light emitted from the light source 100 is flipped before being projected on the area to be irradiated. Such a lens portion 310 increases the angle of light to be emitted.

FIG. 6A is a schematic sectional view of the light source module 1000 shown in FIG. 1B mounted in the electronic device 2000, such as a smartphone. The light source module 1000 mounted in the electronic device is generally housed in the case 600 having such an opening 610 as to allow the exit surface 340 to be exposed.

The case 600 has a thickness of, for example, 0.5 mm to 2 mm. Hence, light emitted from the light source module generally falls on a lateral surface 620 of the opening 610 of the case 600, which tends to hinder broadening of the distribution angle. Particularly in the case in which the lateral surface 620 of the opening 610 of the case 600 is disposed near the exit surface of the light source module, light emitted from the light source module 1000 is likely to fall on the lateral surface 620 of the opening 610.

As the angle between the horizontal plane (XY-plane) and the reflection surface 330 is large as described above in the light source module 1000 according to the present embodiment, light can be emitted from the exit surface 340 toward the central axis C (toward a direction intersecting the central axis C) at a lower angle (angle closer to the horizontal plane). That is, light is radially emitted outward from the light source 100 in a top view, incident on the incidence surface 320, and reflected by the reflection surface 330 in the diagonal directions. Hence, light that has reached the lateral surface 620 of the opening 610 of the case 600 travels to a position above the lateral surface 620, so that light can be emitted at a larger distribution angle.

The upper end of the reflection surface 330 is preferably located above the upper end of the incidence surface 320. For example, the upper end 324 of the reflection surface 330 is located above the upper end 334 of the incidence surface 320 in cross section containing the central axis C as shown in FIG. 4A and FIG. 4B. In other words, in cross section containing the central axis C, the upper end 324 of the reflection surface 330 is closer to the exit surface 340 than the upper end 324 of the incidence surface 320 is. With this structure, light entering through the incidence surface 320 can be efficiently reflected toward the exit surface 340. As the upper end 334 of the reflection surface 330 is located above the upper end 324 of the incidence surface 320 (both of the upper ends of the first incidence areas 321 and the upper ends of the second incidence areas 322), light entering through the first incidence areas 321 and the second incidence areas 322 can be efficiently reflected.

Figure 7:
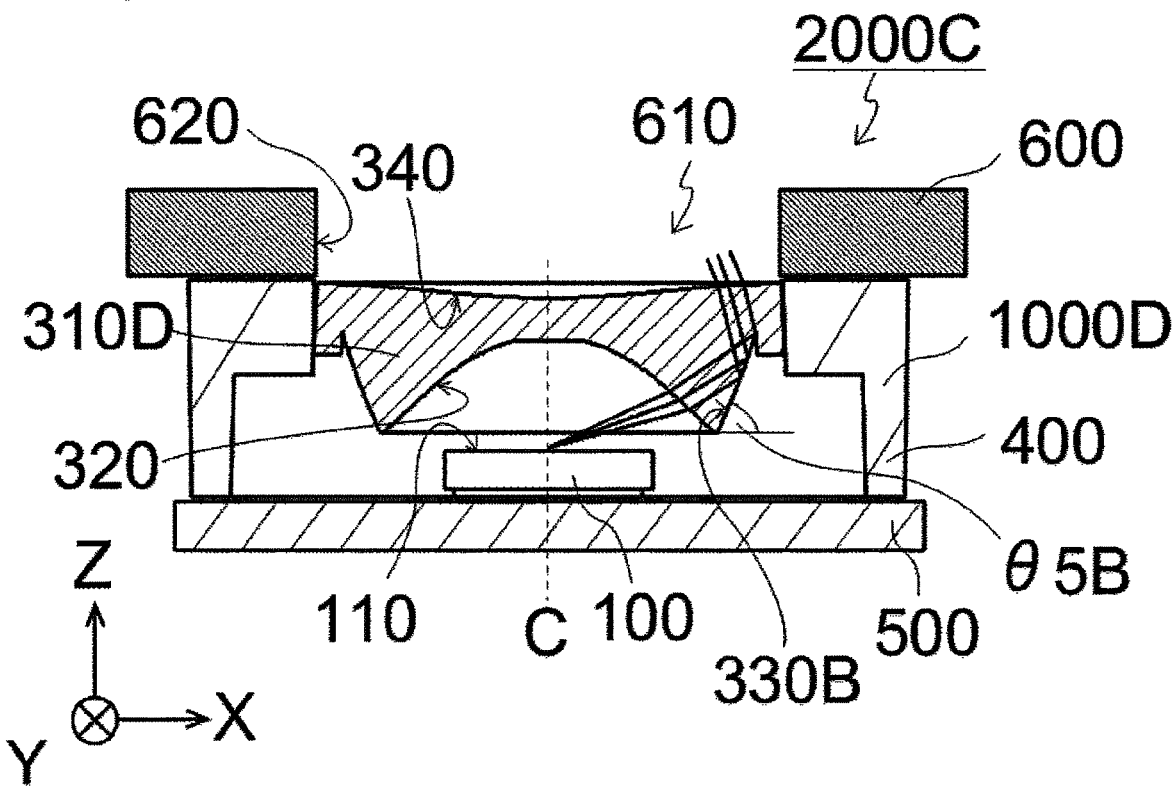
FIG. 7 is a schematic, partial, enlarged view of an illustrative electronic device including a light source module according to the embodiment.

The following describes changes in the light distribution characteristics in the case of a different angle of the reflection surface. The electronic device 2000C shown in FIG. 7 and the electronic device 2000 shown in FIG. 6A have the same angles and curvatures of the incidence surfaces and the exit surfaces of the lens portions but have different angles of the reflection surfaces. Specifically, an angle θ5B (angle θ5B of a reflection surface 330B) between the reflection surface 330B of a lens portion 310D of a light-guide member employed in a cover member of a light source module 1000D shown in FIG. 7 and a horizontal plane (XY-plane) is smaller than an angle θ5 (angle θ5 of the reflection surface 330) between the reflection surface 330 of the lens portion 310 of the light-guide member employed in the cover member of the light source module 1000 shown in FIG. 6A and the horizontal plane (XY-plane). In other words, the angle between the reflection surface 330B of the lens portion 310D shown in FIG. 7 and the central axis C is larger than the angle between the reflection surface 330 of the lens portion 310 of the light-guide member 300 shown in FIG. 6A and the central axis C. For example, the angle θ5 of the reflection surface 330 shown in FIG. 6A is 76 degrees (the angle between the central axis C and the reflection surface 330 is 14 degrees), and the angle θ5B of the reflection surface 330B shown in FIG. 7B is 70 degrees (the angle between the central axis C and the reflection surface 330B is 20 degrees). With this structure, the distribution angle of a light source module 1000D shown in FIG. 7 is smaller than the distribution angle of the light source module 1000 shown in FIG. 6A.

As described above, the larger the angle (angle from the XY-plane) of the reflection surface is, the larger the light distribution angle becomes.

The reflection surface 330 can have a substantially circular shape or have four-fold or two-fold symmetry about the central axis C similarly to the incidence surface 320 in a bottom view. For example, the reflection surface 330 can include first reflection areas 331 each having a curved convex shape and located outside the first incidence areas 321 in a bottom view as shown in FIG. 3. In addition, the reflection surface 330 can include second reflection areas 332 each having a curved concave shape and located outside the second incidence areas 322 in a bottom view. The second reflection areas 332 each having a curved concave shape in a top view prevent light reflected near the lower ends 325 of the second reflection areas 332 from being incident on the incidence surface 320 again. This is because forming the second reflection areas 332 into curved concave surfaces in a top view reduces the angle between the horizontal plane and the reflection surface 330 near the lower end 335 of the reflection surface 330, that is, causes the surface to face upward. In addition, the angle between the second reflection areas 332 and the horizontal plane can be large near the upper ends 334 of the second reflection areas 332. Accordingly, light can be reflected at a lower angle (angle closer to the horizontal plane) in a direction intersecting the central axis C, and the distribution angle of the light emitted from the exit surface 340 can be large.

In the case in which the reflection surface 330 includes the first reflection areas 331 and the second reflection areas 332, the regions, ratios, angles, and the like of the areas are adjusted according to the first incidence areas 321 and the second incidence areas 322. Similar to the boundaries between the first incidence areas 321 and the second incidence areas 322, the boundaries between the first reflection areas 331 and the second reflection areas 332 may be difficult to visually recognize clearly.

In the case in which the reflection surface 330 includes the first reflection areas 331 and the second reflection areas 332, the angle θ5 shown in FIG. 4A between a straight line connecting the upper end 334 and the lower end 335 of each first reflection area 331 and the horizontal plane can be 45 degrees to 90 degrees. An angle θ6 shown in FIG. 4B between a straight line connecting the upper end 334 and the lower end 335 of each second reflection area 332 and the horizontal plane can be 45 degrees to 90 degrees. The angle θ6 of the second reflection area 332 is preferably larger than the angle θ5 of the first reflection area 331. With this structure, the second reflection area 332 can reflect light entering through the second incidence area 322 at such an angle that the light is emitted at a larger distribution angle to the outside. Light reflected by the second reflection area 332 in the reflection surface and emitted from the exit surface has been described referring to FIG. 6A and FIG. 7. The same description applies to light reflected by the first reflection area 331 and emitted from the exit surface 340.

Next, the exit surface 340 will be described. The exit surface 340 of the lens portion 310 has a concave shape on the upper surface of the lens portion 310. The exit surface 340 of the lens portion 310 is preferably a curved concave surface. The portion on which the central axis C is located is the center of the exit surface 340, and the center of the exit surface 340 is located directly above the center of the incidence surface 320. In the case of the concave exit surface 340, the exit surface 340 is lowest on the central axis C as shown in FIG. 1B and other drawings. In other words, the exit surface 340 is most deeply depressed at the center located on the central axis C toward the lower side from the upper side. Forming the exit surface 340 into a curved concave shape increases the angles of incidence on the exit surface 340 of light entering through the incidence surface 320 and light reflected by the reflection surface 330. Hence, the light distribution angle can be increased by utilizing the difference in refractive indices between the exit surface 340 and the outside air.

The exit surface 340 can be a curved convex surface or a flat surface instead of the above curved concave surface in cross section containing the central axis C depending on the area to be irradiated, the angle of view of the camera, and the like.

In the case of the concave exit surface 340 as shown in FIG. 1A, a slightly distorted circular shape in a top view is possible. In the case in which the reflection surface 330 includes the first reflection areas 331 and the second reflection areas 332 as described above, the reflection surface 330 has a cross-like shape projecting upward, downward, rightward, and leftward from the central axis C in a top view in an appropriate horizontal plane perpendicular to the central axis C as shown in FIG. 5A to FIG. 5D. Specifically, the first reflection areas 331 project upward, downward, rightward, and leftward (in the X and Y directions) in a top view, and the second reflection areas 332 are located closer to the central axis C. Correspondingly to such a reflection surface 330, the exit surface 340 can also have a depressed portion 341 centered around the central axis C. In the case in which the exit surface 340 has the depressed portion 341, the shape of the depressed portion 341 has four-fold symmetry in a top view. In the case in which the exit surface 340 has the depressed portion, it is preferable that the depressed portion smoothly change into a flat portion 342 around the depressed portion. The outer edge of the depressed portion 341 located at the center of the exit surface 340 enclosing the central axis C is indicated by a dashed line in FIG. 1A, but the actual outer edge may be difficult to visually recognize clearly. In the case in which the exit surface 340 has the depressed portion 341, the depressed portion 341 is preferably larger in size than the incidence surface 320 in a top view. This structure allows much of light from the reflection surface 330 and the incidence surface 320 to be incident on the depressed portion 341. The flat portion 342 around the depressed portion 341 is continuous with the flange 350 and is hardly irradiated with light in like manner with the flange 350.

As the lens portion employed in the light source module according to the present embodiment has four-fold symmetry as described above, light to be emitted also has four-fold symmetry. Hence, in the case in which a plurality of lens portions are used, the orientation of each lens portion is preferably adjusted.

For example, in the case in which one light source module 1000 includes the light-guide member 300 including two lens portions 310 (the first lens portion 311 and the second lens portion 312) as shown in FIG. 1A, the orientations of the lens portions 310 are preferably adjusted such that the combination (referred to as a group of lenses) of the two lens portions 310 has line symmetry. Specifically, in the case in which the first lens portion 311 and the second lens portion 312 are arranged such that their rotation axes C are aligned in the Y direction as shown in FIG. 1A, FIG. 3, and other drawings, four first incidence areas 321 of each incidence surface are preferably arranged in the Y and X directions. The second incidence areas 322 are located at positions rotated 45 degrees from the above areas. Disposing the first incidence areas 321 and the second incidence areas 322 of the two lens portions 310 in the same orientations as described above makes the amount of light emitted in directions rotated 45 degrees from the X and Y directions larger than the amount of light emitted in the X and Y directions in a top view.

In the case in which the light source module includes one lens portion 310, the area to be irradiated can be, for example, square because the incidence surface has four-fold symmetry. On the other hand, in the case in which the light source module includes two lens portions 310 and where the first incidence areas 321 and the second incidence areas 322 are aligned as shown in FIG. 1A, FIG. 3, and other drawings, the area to be irradiated can be, for example, rectangular. The area to be imaged by a camera forms a rectangle with an aspect ratio of, for example, 4:3 or 16:9 in many cases. In such a case, the light source module 1000 including the two lens portions 310 arranged as described above achieves uniform illumination of the area to be irradiated, which is the area to the imaged.

(Flange)

Next, the flange 350 surrounding the lens portions 310 will be described. The flange 350, which is part of the light-guide member 300, is a member located in a portion that does not contribute to the control of the distribution of light and in a portion joined to a supporting portion 410 of the supporting member 400 described later. The flange 350 and the lens portions 310 are molded in one piece and are made of the same material.

The flange 350 is located on the exit surface 340 of the lens portions 310, or the upper side, in a sectional view. The flange 350 is exposed on the upper surface of the light source module 1000 around the exit surfaces 340 and constitutes part of the upper surface of the light source module 1000. In addition, the upper surface of the flange 350 can constitute one surface continuous with the peripheries of the exit surfaces 340 of the lens portions 310. The lower surface of the flange 350 is continuous with the upper end 334 of the reflection surface 330 of each lens portion 310 and is away from the lower end 335 of the reflection surface 330.

The flange 350 may include at its outer edge a projection projecting downward. The projection is separated from the lens portions 310 and connected to the inner wall of the opening of the supporting member 400 as shown in FIG. 1B and FIG. 1C. The projection provided on the periphery of the flange 350 enhances the strength of the light-guide member 300. The bonding strength to the supporting member 400 is also enhanced.

In the case in which the light-guide member 300 includes a plurality of lens portions 310 (such as two lens portions: the first lens portion 311 and the second lens portion 312), the flange 350 can be disposed between the lens portions 310 as shown in FIG. 1D. This structure provides an integrated light-guide member 300 including a plurality of lens portions 310. The above projection can be disposed so as to surround the peripheries of two lens portions 310. The projection of the flange 350 preferably has a length shorter than the length of a leg portion 420 of the supporting member 400 described later. In addition, the lower end (lower end of the projection) of the flange 350 is preferably located above the lower ends 335 of the reflection surfaces 330 of the lens portions 310.

(Supporting Member)

The supporting member 400 constitutes part of the cover member 200 and supports the light-guide member 300. The supporting member 400 supports the light-guide member 300 such that the lens portions 310 of the light-guide member 300 are located directly above the light sources 100, specifically directly above the light sources 100 and away from the light emission surfaces 110 of the light sources 100.

The supporting member 400 includes the supporting portion 410 supporting the light-guide member 300 and the leg portion 420 located below the supporting portion 410. The supporting portion 410 surrounds the periphery of the light-guide member 300 and is joined to the flange 350 of the light-guide member 300. The leg portion 420 is disposed outside the light sources 100 and joined to the wiring board 500 on or above which the light sources 100 are mounted. The upper surface of the supporting member 400 constitutes part of the upper surface of the light source module 1000, and the lateral surfaces of the supporting member 400 constitute part of the lateral surfaces of the light source module 1000.

The supporting member 400 can be formed of a light-shielding member that does not transmit light emitted from the light sources 100. The term "light-shielding" here means that 50% or more, preferably 80% or more, further preferably 90% or more, of light emitted from the light sources 100 is blocked. The supporting member 400 can be formed of a light-transmissive member made of a resin such as a polycarbonate resin, an acrylic resin, a silicone resin, or an epoxy resin. It is preferable that the above material also be used as the base material and that a light-shielding member be contained. Examples of a light-reflective light-shielding member include titanium oxide, alumina oxide, and zirconium oxide. Examples of a light-absorbing light-shielding member include carbon and paints. One of these materials may be used, or a plurality of materials may be used in the form of a mixture.

(Light Sources)

Figure 8A:
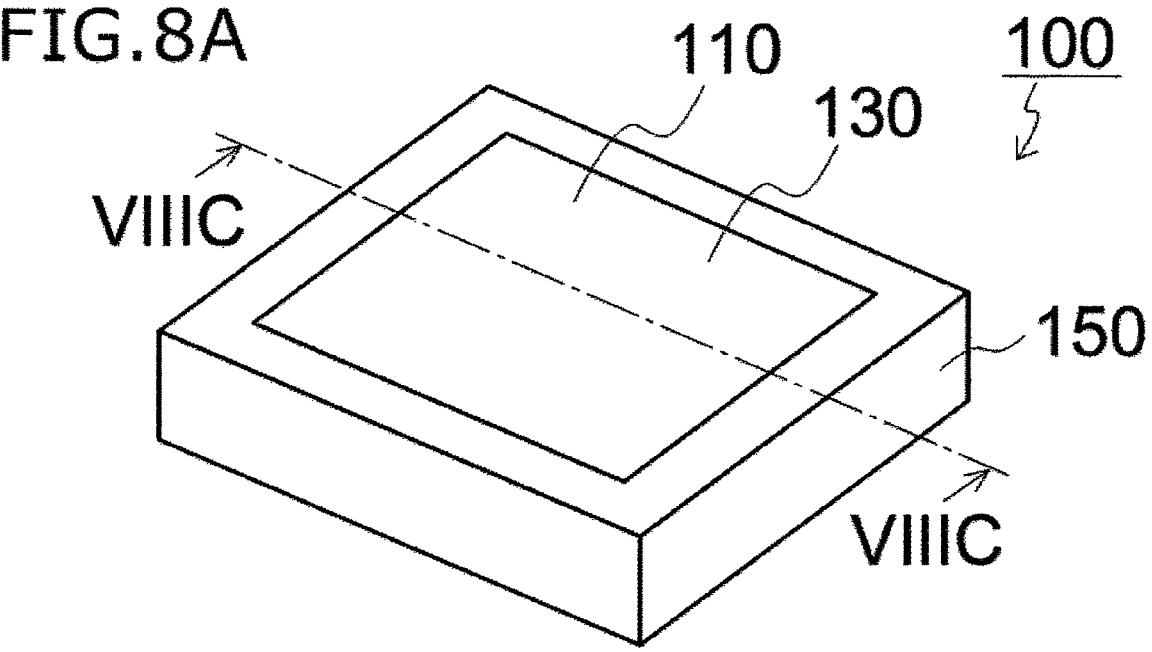
FIG. 8A is a schematic perspective view of an illustrative light source according to the embodiment.
Figure 8B:
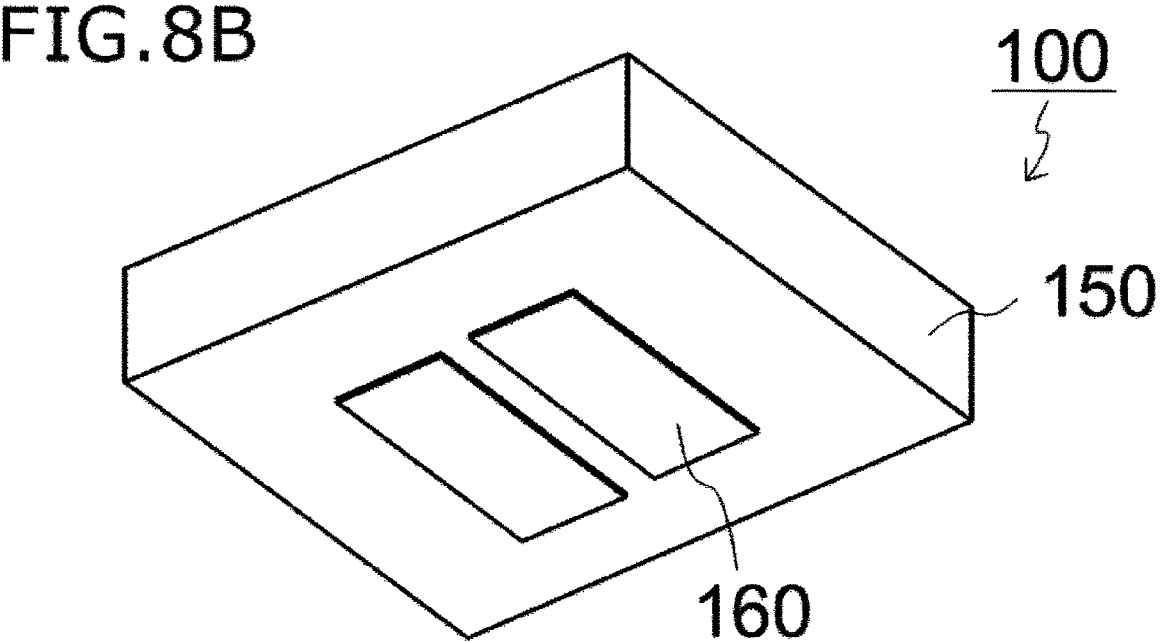
FIG. 8B is a schematic perspective view of the illustrative light source according to the embodiment.

Semiconductor light-emitting elements such as light-emitting diodes (LEDs) or light-emitting devices containing semiconductor light-emitting elements can be used as the light sources 100. For example, the light source 100 shown in FIG. 8A to FIG. 8C is an example of a light-emitting device containing a semiconductor light-emitting element. Specifically, the light-emitting device serving as the light source 100 includes a semiconductor light-emitting element 120 and a light-transmissive member 130 disposed above the semiconductor light-emitting element 120 with a bonding member 140 therebetween. The bonding member 140 is also disposed on the lateral surfaces of the semiconductor light-emitting element 120. The lateral surfaces of the semiconductor light-emitting element 120 are covered with a covering member 150 with the bonding member 140 therebetween. The light source 100 has an upper surface including the light emission surface 110. The lateral surfaces of the light source 100 may also include the light emission surface. The light emission surface is preferably located only on the upper surface or on the upper surface and the lateral surfaces near the upper end. The light emission surface 110 can have a polygonal shape such as a quadrangular, triangular, pentagonal, or hexagonal shape or a circular or elliptic shape in a top view. The light emission surface 110 preferably has a square shape in a top view. In the case in which the light emission surface 110 is quadrangular, the arrangement is preferably adjusted such that the second incidence areas 322 of the incidence surface 320 of the lens portion 310 correspond to the four corners of the light emission surface 110.

The semiconductor light-emitting element 120 includes a semiconductor layered body 121 and element electrodes 122. The semiconductor layered body 121 includes a semiconductor layer including a light-emitting layer. The semiconductor layered body 121 may further include a light-transmissive substrate such as a sapphire substrate. An example of the semiconductor layered body can include three semiconductor layers: a first conductive semiconductor layer (such as an n-type semiconductor layer), a light-emitting layer (active layer), and a second conductive semiconductor layer (such as a p-type semiconductor layer). Semiconductor layers that can emit ultraviolet light or visible light in the blue to green region can be formed of, for example, a semiconductor material such as group III-V compound semiconductors. Specifically, a nitride semiconductor material such as $In_xAl_yGa_{1-X-Y}N$ (where $0 \leq X$, $0 \leq Y$, and $X+Y \leq 1$) can be used. Examples of a semiconductor layered body that can emit red light include GaAs, GaAlAs, GaP, InGaAs, and InGaAsP. The thickness of the semiconductor layered body 121 can be, for example, 3 μm to 500 μm. The semiconductor light-emitting element 120 may be used alone.

The lateral surfaces of the element electrodes 122 are covered with the covering member 150, and the lower surfaces of the element electrodes 122 are exposed from the covering member 150. The lower surfaces of the element electrodes 122 may be directly exposed to the outside or may be covered with a metal layer 160 as shown in FIG. 8B and FIG. 8C.

The element electrodes 122 can be formed of a known material with a known structure in the field of the invention and can have any thickness. For example, the thickness of the element electrodes 122 is preferably 1 μm to 300 μm. A good electrical conductor, suitably a metal such as Cu, can be used for the element electrodes 122.

The covering member 150 is a light-reflective member that directly or indirectly covers the lateral surfaces of the semiconductor light-emitting element 120. The covering member 150 is a member that can reflect light emitted from the semiconductor light-emitting element 120 and can be made of, for example, a resin material containing a light-reflective substance. The reflectance of the covering member 150 with respect to light emitted from the semiconductor light-emitting element 120 is preferably 70% or more, more preferably 80% or more, further preferably 90% or more.

The base material of the covering member 150 is preferably a resin material containing mainly a thermosetting resin such as a silicone resin, a modified silicone resin, an epoxy resin, or a phenolic resin. For example, a white substance can be used as the light-reflective substance contained in the resin material. Specifically, suitable examples of the light-reflective substance include titanium oxide, silicon oxide, zirconium oxide, potassium titanate, aluminum oxide, aluminum nitride, boron nitride, and mullite. A granular, fibrous, or flaky light-reflective substance can be used.

The light-transmissive member 130 is a member that can transmit light emitted from the semiconductor light-emitting element 120 and constitutes the light emission surface 110 of the light source 100. A light-transmissive resin material, glass, or the like can be used for the light-transmissive member 130. For example, a thermosetting resin, such as a silicone resin, a modified silicone resin, an epoxy resin, or a phenolic resin, can be used. Alternatively, a thermoplastic resin, such as a polycarbonate resin, an acrylic resin, a methylpentene resin, or a polynorbornene resin, can be used. A silicone resin, which has good resistance to light and heat, is particularly suitable. The transmittance of the light-transmissive member 130 with respect to light emitted from the semiconductor light-emitting element is preferably 70% or more, more preferably 80% or more, further preferably 90% or more. The light-transmissive member 130 may contain a phosphor, a light-diffusing material, or the like described later.

A material that absorbs light emitted from the semiconductor light-emitting element 120 and converts the light into light with a different wavelength is used as the phosphor. In other words, a material that can be excited by light emitted from the semiconductor light-emitting element 120 is used. Examples of a phosphor that can be excited by a blue or ultraviolet light-emitting element include cerium-activated yttrium-aluminum-garnet phosphors (YAG:Ce); cerium-activated lutetium-aluminum-garnet phosphors (LAG:Ce); europium- and/or chromium-activated nitrogen-containing calcium aluminosilicate phosphors ($CaO$—$Al_2O_3$—$SiO_2$); europium-activated silicate phosphors (($Sr,Ba)_2SiO_4$); nitride phosphors such as β-SiAlON phosphors, CASN phosphors, or SCASN phosphors; KSF phosphors ($K_2SiF_6$:Mn); sulfide phosphors; and quantum-dot phosphors. Combinations of such phosphors and blue or ultraviolet light-emitting elements enable light-emitting devices emitting various colors (such as light emitting devices emitting white light) to be manufactured. One or more of these phosphors can be used. In the case in which a plurality of phosphors are used, the phosphors may be mixed or layered.

A wavelength conversion member may contain various fillers for the purpose of, for example, adjusting the viscosity.

The bonding member 140 bonds the semiconductor light-emitting element 120 to the light-transmissive member 130. In addition, the bonding member 140 covers the lateral surfaces of the semiconductor light-emitting element 120 to guide light emitted from the lateral surfaces of the semiconductor light-emitting element 120 to the light-transmissive member 130. A light-transmissive resin material can be used for the bonding member 140. Preferable examples of the light-transmissive resin material include a resin material containing mainly a thermosetting resin such as a silicone resin, a modified silicone resin, an epoxy resin, or a phenolic resin. The transmittance of the bonding member 140 with respect to light emitted from the semiconductor light-emitting element is preferably 70% or more, more preferably 80% or more, further preferably 90% or more.

A material having better resistance to corrosion and oxidation than those of the element electrodes 122 of the semiconductor light-emitting element 120 is preferably selected as the metal layer 160. The metal layer 160 may be formed of only one layer of a single material or may have a layered structure of different materials. A metal material, such as Ru, Mo, or Ta, having a high melting point is particularly preferably used. Also, such a metal material having a high melting point disposed between the element electrodes of the semiconductor light-emitting element and the outermost layer can serve as a diffusion preventing layer that can suppress diffusion of Sn contained in solder into the electrodes of the light-emitting element and layers near the electrodes. Examples of a layered structure including such a diffusion preventing layer include Ni/Ru/Au and Ti/Pt/Au. The thickness of the diffusion preventing layer (such as Ru) is preferably approximately 10 Å to 1,000 Å.

(Wiring Board)

The wiring board 500 includes a base and wiring disposed on an upper surface of the base. For example, an insulating material such as a ceramic, glass epoxy, or phenolic paper can be used for the base. Alternatively, an electrically-conductive material containing a metal such as aluminum can be used for the base. In this case, an insulating layer is disposed between the electrically-conductive base and the wiring. The wiring board can have, for example, a quadrangular or circular shape. For example, Cu, Ag, or the like can be used as the material for the wiring. In addition, the surface of the wiring can be, for example, Au-plated or solder-plated. A water-soluble flux may be disposed on the wiring instead of the above plating. For example, an epoxy resin or a silicone resin can be used for the insulating layer.

(Case)

The case 600 is a casing that houses the light source module 1000 and other components and constitutes part of the outer surfaces of the electronic device 2000. Various materials such as resin, wood, or metal and various shapes for the case 600 may be employed depending on the purpose and the intended use and in consideration of the design qualities. For example, in the case of a small communication device such as a smartphone having a camera function, the light source module 1000 is disposed near a lens for the camera and housed in the case 600 together with the lens for the camera.

The case 600 has the opening 610 through which light emitted from the light source module 1000 can be emitted to the outside. The opening 610 can be slightly smaller in size than the exit surface 340 of the light source module 1000. The inner lateral surface of the opening 610 can be a vertical surface as shown in a sectional view of FIG. 6A. Alternatively, the inner lateral surface of the opening 610 may have such a shape that the inside diameter on the upper surface is larger than the inside diameter on the lower surface. In other words, the inner lateral surface of the opening may be an inclined surface that broadens upward. Such an inclined surface is unlikely to block light emitted from the light source module 1000 and broadens the distribution of light to be emitted.

The invention claimed is:

1. A light source module comprising:
    a light source having an upper surface comprising a light emission surface; and
    a light-guide member comprising a lens portion having a central axis that extends through the light emission surface,
    wherein the lens portion comprises:
        a concave incidence surface facing the light emission surface of the light source and configured to receive light from the light source;
        a reflection surface disposed outside the incidence surface, the reflection surface being configurd to reflect part of light entering through the incidence surface, and being inclined at an angle of 45 degrees or more from a direction perpendicular to the central axis; and
        an exit surface configured to allow part of the light entering through the incidence surface and light reflected by the reflection surface to exit the lens portion, and
    wherein the incidence surface comprises:
        a first incidence area having four-fold symmetry about the central axis and having a curved concave shape in a cross section containing the central axis; and a second incidence area having a curved convex shape in a cross section rotated 45 degrees from the first incidence area and containing the central axis.

2. The light source module according to claim 1, wherein an area of the first incidence area is larger than an area of the second incidence area.

3. The light source module according to claim 1, wherein an angle between a straight line connecting an upper end and a lower end of the first incidence area and a horizontal plane is in a range of 20 degrees to 70 degrees.

4. The light source module according to claim 1, wherein an angle between a straight line connecting an upper end and a lower end of the second incidence area and a horizontal plane is in a range of 20 degrees to 70 degrees.

5. The light source module according to claim 1, wherein the incidence surface comprises a flat third incidence area perpendicular to the central axis in an area through which the central axis extends.

6. The light source module according to claim 1,
wherein the reflection surface has a curved concave shape in cross section containing the central axis, and
wherein an angle between a straight line connecting an upper end and a lower end of the reflection surface and a horizontal plane is in a range of 45 degrees to 90 degrees.

7. The light source module according to claim 1, wherein the upper end of the reflection surface is located above the incidence surface.

8. The light source module according to claim 1,
wherein the reflection surface comprises:
a first reflection area having a curved convex shape in a bottom view and disposed outside the first incidence area; and
a second reflection area having a curved concave shape in the bottom view and disposed outside the second incidence area.

9. The light source module according to claim 1, wherein the exit surface comprises a curved concave surface.

10. The light source module according to claim 9, wherein the exit surface has four-fold symmetry.

* * * * *